(12) United States Patent
Futamura et al.

(10) Patent No.: US 7,149,894 B2
(45) Date of Patent: Dec. 12, 2006

(54) PUBLIC-KEY CERTIFICATE ISSUANCE REQUEST PROCESSING SYSTEM AND PUBLIC-KEY CERTIFICATE ISSUANCE REQUEST PROCESSING METHOD

(75) Inventors: Ichiro Futamura, Kanagawa (JP); Yoshihito Ishibashi, Tokyo (JP); Shinako Matsuyama, Tokyo (JP); Masashi Kon, Kanagawa (JP); Hideaki Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 09/951,680

(22) Filed: Sep. 13, 2001

(65) Prior Publication Data
US 2002/0073311 A1    Jun. 13, 2002

(30) Foreign Application Priority Data
Sep. 21, 2000    (JP)    ............................ P2000-286656

(51) Int. Cl.
*H04L 9/00*    (2006.01)
(52) U.S. Cl. ..................................... 713/157
(58) Field of Classification Search ............... 713/155, 713/156, 157, 175; 726/2, 5, 10; 380/277, 380/278
See application file for complete search history.

(56) References Cited

U.S. PATENT DOCUMENTS 5,745,574 A * 4/1998 Muftic ....................... 713/157
5,768,519 A * 6/1998 Swift et al. .................. 709/223
5,799,096 A * 8/1998 Liao ............................ 381/161
6,035,402 A * 3/2000 Vaeth et al. .................. 713/201

OTHER PUBLICATIONS

Lions, B., "A public authentication framework for Australia," Privacy & Policy Reporter 3 PLPR 28, 1996.*
Diffie, W., "Authentication and Authenticated Key Exchanges," Designs, Codes and Cryptography, Kluwer Academic Publishers, 1992.*

* cited by examiner

*Primary Examiner*—Gilberto Barron
*Assistant Examiner*—Thomas M Ho
(74) *Attorney, Agent, or Firm*—Sonnenschein Nath & Rosenthal LLP

(57) ABSTRACT

Provided is a structure enabling dispersion of a load that is incurred by a public key certificate issuer authority or a registration authority. The structure has an issuer authority that issues a public key certificate and registration authorities each of which receives and examines a request for issuance of a public key certificate made by an end entity, wherein the registration authorities are hierarchically structured. Each of registration authorities of a hierarchical level manages registration authorities that rank immediately below or end entities. The registration authority receives a request for issuance of a public key certificate and examines it. This means that a load each registration authority must incur for processing is dispersed. One hierarchical structure of registration authorities is formed under any of various standards which stipulates a security policy, scalability, geographical classification, functional classification, or an organization.

11 Claims, 14 Drawing Sheets

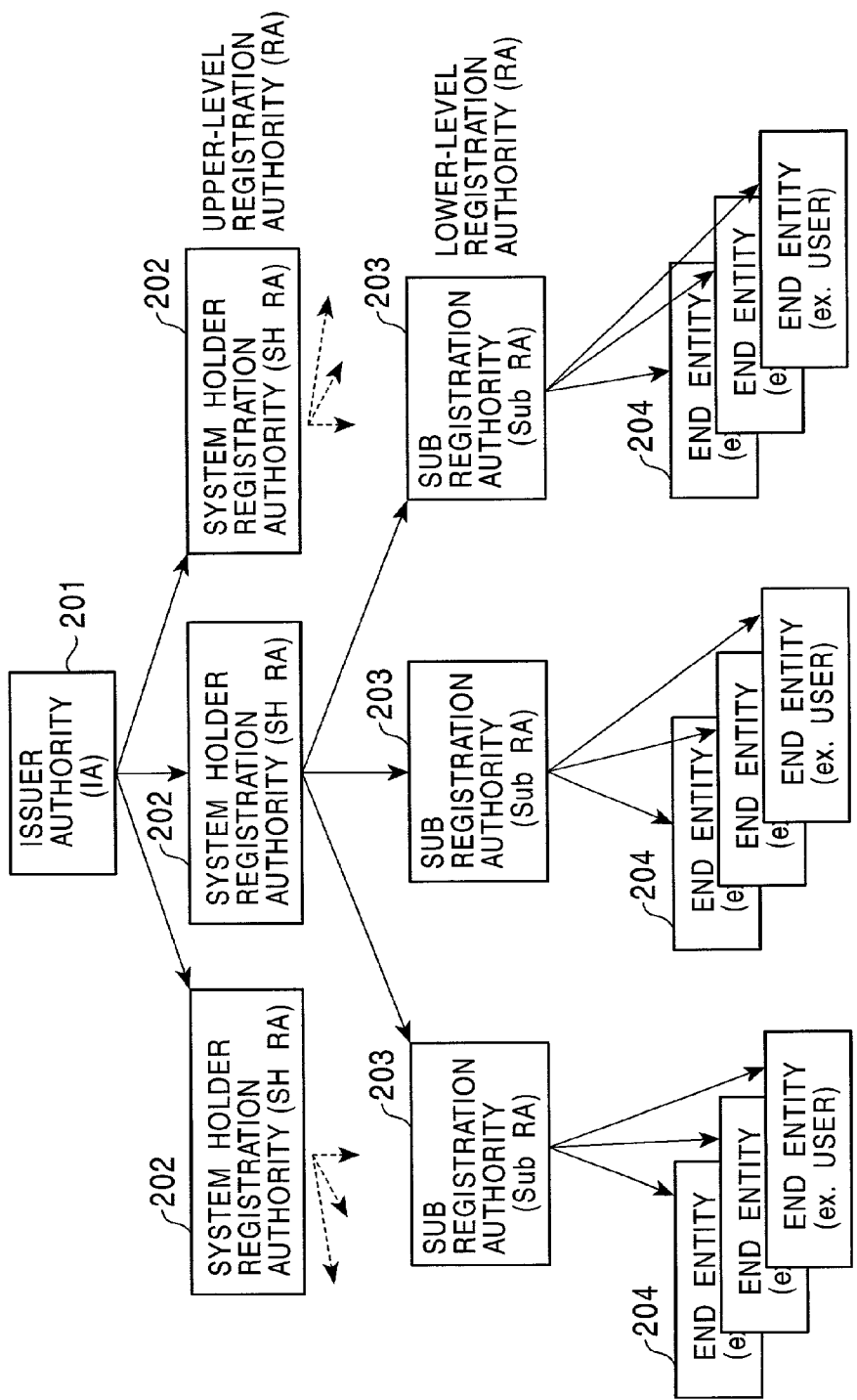

FIG. 3

| | STANDARD | DESCRIPTION |
|---|---|---|
| (1) | GROUPING | MANAGING USERS IN GROUPS |
| (2) | SECURITY POLICY | MANAGING USERS IN UNITS IN WHICH USERS CAN BE MANAGED UNDER THE SAME SECURITY POLICY |
| (3) | SCALABILITY | DISPERSING REGISTRATION AUTHORITIES BY SCALE |
| (4) | GEOGRAPHIC CLASSIFICATION | CLASSIFYING REGISTRATION AUTHORITIES DEPENDING ON WHETHER REGISTRATION AUTHORITY IS LOCATED IN JAPAN OR US, OR EAST JAPAN OR WEST JAPAN, OR THE LIKE |
| (5) | FUNCTIONAL CLASSIFICATION | CLASSIFYING REGISTRATION AUTHORITIES DEPENDING ON WHETHER REGISTRATION AUTHORITY MERELY ISSUES NEW PUBLIC KEY CERTIFICATE OR UPDATES PUBLIC KEY CERTIFICATE |
| (6) | ORGANIZATION | CLASSIFYING AND MANAGING USERS IN ORGANIZATIONS, THAT IS, DEPENDING ON WHETHER USER IS COMPANY, CORPORATE BODY, OR THE LIKE |

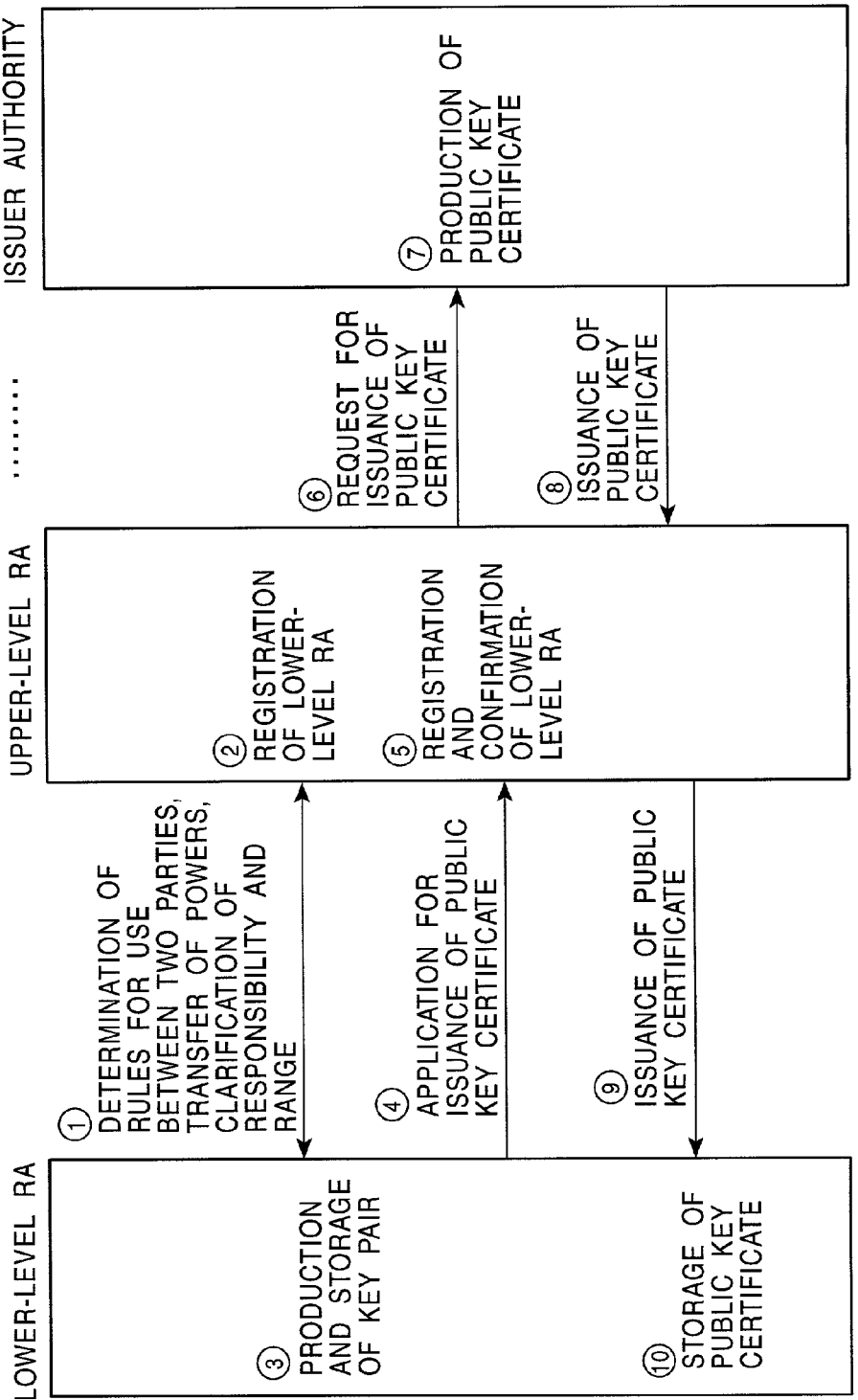

PUBLIC-KEY CERTIFICATE ISSUANCE REQUEST PROCESSING SYSTEM AND PUBLIC-KEY CERTIFICATE ISSUANCE REQUEST PROCESSING METHOD

BACKGROUND OF THE INVENTION

1. Field of the Invention

The present invention relates to an public-key certificate issuance request processing system and an public-key certificate issuance request processing method for issuing and managing an public-key certificate that testifies validity of an public-key used to transmit encrypted data, and managing such public-key certificates. More particularly, the present invention is concerned with an public-key certificate issuance request processing system composed mainly of a certificate authority and registration authorities that are hierarchically structured, and an public-key certificate issuance request processing method. The certificate authority is an organization for issuing a public-key certificate. Each of the registration authorities receives a request for issuance of a public-key certificate made by an end entity, which is a user, to the certificate authority.

2. Description of the Related Art

What is booming these days is distribution of diverse software packages (which shall be referred to as contents), such as, audio data, image data, game programs, and other various application programs over the Internet or any other network. Moreover, even in the fields of online shopping and financial dealings, processing over a network is popular.

In data communication over a network, after a data transmitting side and a data receiving side confirm that their partners are authentic objects of data transmission or data reception, required information is transferred. In short, a secure data transmission method is adopted generally. Technologies for ensuring security for data transfer include encryption of data to be transferred and signing of data.

Encrypted data to be transferred is translated back to usable decrypted data through a predetermined decrypting procedure. A data encrypting/decrypting method that uses an encryption key to encrypt information and uses a decryption key to decrypt encrypted information has been widely adopted in the past.

The data encrypting/decrypting method that employs the encryption key and decryption key is realized in various forms. One of the forms is a so-called public-key encryption technology. The public-key encryption technology is such that: a key used by an originator and a key used by a recipient are different from each other; one of the keys is a public key usable by an unspecified number of users; and the other key is a secret key known only to one user. For example, the public key is adopted as the data encryption key, and the secret key is adopted as the data decryption key. Otherwise, the secret key is adopted as a certifier production key, and the public key is adopted as a certifier decryption key.

Unlike a common-key encryption technology that employs a common key in encryption and decryption alike, according to the public-key encryption technology, the secret key that must be kept secret is known only to one person and can therefore be managed easily. However, compared with the common-key encryption technology, the public-key encryption technology suffers a low data processing rate. The public-key encryption technology is therefore adapted to a case where only a small amount of data is distributed as the secret key or as a digital signature. A typical public-key encryption technology is the RSA (which stands for Rivest, Shamir, and Adleman) technology. The RSA technology employs a product of two very large prime numbers (of, for example, 150 digits long) and utilizes the difficulty in factorization of the product of two large prime numbers (for example, 150 digits).

The public-key encryption technology allows an unspecified number of people to use the public key. A method of employing a certificate, which states that a distributed public key is valid, that is, a so-called public-key certificate is widely adopted. For example, user A produces a pair of a public key and a secret key, transmits the produced public key to a certificate authority, and receives a public key certificate from the certificate authority. User A allows the general public to access the public key certificate. An unspecified number of users checks the public key certificate, gets the public key according to a predetermined procedure, encrypts a document or the like, and transmits the resultant document to user A. User A uses a secret key to decrypt the encrypted document or the like. Moreover, user A uses the secret key to sign a document or the like. An unspecified number of users checks the public key certificate, gets the public key according to the predetermined procedure, and verifies the signature.

The public key certificate will be described in conjunction with FIG. 1. The public key certificate is a certificate issued from the certificate authority (CA) (or issuer authority (IA)) employed in the public-key encryption technology. A user presents his/her own identifier (ID) and public key to the certificate authority. The certificate authority appends information such as an own ID and an effective period to the certificate, and adds a signature thereto. Thus, the public key certificate is completed.

The public key certificate shown in FIG. 1 consists of a version number assigned to the certificate, a serial number which the certificate authority assigns to a user, an algorithm and parameters used to produce a digital signature, the name of the certificate authority, the effective period during which the certificate is effective, the name of a certificate user (user ID), and a public key and an digital signature produced by the certificate user.

The digital signature is data produced by applying a secret key produced by the certificate authority to hash values. The hash values are produced by applying a hashing function to the version number assigned to the certificate, the serial number which the certificate authority assigns to the certificate user, the algorithm and parameters used to produce the digital signature, the name of the certificate authority, the effective period of the certificate, the name of the certificate user, and the public key produced by the certificate user.

The certificate authority issues the public key certificate shown in FIG. 1, and updates a public key certificate whose effective period is expired. Moreover, the certificate authority creates, manages, and distributes a black list for the purpose of driving out dishonest users (this action shall be referred to as revocation). Moreover, the certificate authority produces a public key and a secret key if necessary.

When a user wants to utilize the public key certificate, the user uses his/her own public key assigned by the certificate authority, and verifies the digital signature of the public key certificate. After the user succeeds in verifying the digital signature, the user retrieves the public key from the public key certificate and uses the public key. All users who use the public key certificate must therefore have the common public key assigned by the certificate authority.

As mentioned above, e-commerce that includes buying and selling of products with digital cash via electronic data interchange, which utilizes the Internet, is growing rapidly.

A secure mechanism for certifying that an individual is who he/she claims to be or certifying that a message is what the message should be is essential for two parties to have secure electronic dealings with each other. One of means for realizing the mechanism that have attracted attention most greatly is a certification system that utilizes the aforesaid public key and the public key certificate issued from a certification authority.

In a data transmission system that adopts the aforesaid public-key encryption technology which utilizes a public key certificate issued from a certification authority, it is necessary to construct a certification system that requests a certificate authority to issue a public key certificate for an unprecedented public key.

For example, a service provider who provides a service of, for example, distributing contents or selling products or a user who receives the service from the service provider must apply to a certificate authority for issuance and management of a public key certificate for a public key specific to a new service. Otherwise, the user cannot use the new public key. This results in an increase in an amount of time-consuming processing that the certificate authority must perform. The time-consuming processing accompanies issuance of a public key certificate and includes user screening.

Processing to be performed by the certificate authority falls broadly into the processing that is performed as the role of an issuer authority of issuing a public key certificate and the processing that is performed as the role of a registration authority of receiving and examining an issuance request. In terms of issuance and management of a public key certificate, the role of the issuer authority is highly common and less dependent on a service. In contrast, the role of the registration authority of registering and examining a public key certificate has close relation to each service and depends highly on a service. An existing certificate authority has the roles of both the issuer authority and registration authority integrated thereinto. The certificate authority therefore must incur a very large load in providing a certification service.

SUMMARY OF THE INVENTION

Accordingly, an object of the present invention is to provide a public key certificate issuance request processing system and a public key certificate issuance request processing method which make it possible to lighten a load incurred by a certificate authority accommodated by a public key certificate issuance system and to efficiently issue a public key certificate.

According to the first aspect of the present invention, there is provided a public key certificate issuance request processing system that consists mainly of a public key certificate issuer authority and a hierarchical structure of registration authorities. The public key certificate issuer authority issues a public key certificate for an object of certification that performs data transfer according to a public key encryption technology. The hierarchical structure of registration authorities has at least two hierarchical levels. Specifically, the hierarchical structure of registration authorities consists mainly of an uppermost-level registration authority and a lowermost-level registration authority. The uppermost-level registration authority transfers data to or from the public key certificate issuer authority. Moreover, the uppermost-level registration authority certifies a registration authority that ranks immediately below the uppermost-level registration authority, receives a request for issuance of a public key certificate made by the registration authority that ranks immediately below, and transfers the request for issuance of a public key certificate to the public key certificate issuer authority. The lowermost-level registration authority ranks lowermost within the hierarchical structure of registration authorities. The lowermost-level registration authority certifies an end entity that is controlled by the lowermost registration authority, and transfers a request for issuance of a public key certificate made by the end entity to an upper-level registration authority that ranks immediately above the lowermost-level registration authority.

Furthermore, in an embodiment of the public key certificate issuance request processing system in accordance with the present invention, a registration authority included in the hierarchical structure of registration authorities certifies a registration authority that ranks immediately below or an end entity, and examines and receives a request for issuance of a public key certificate made by the registration authority that ranks immediately below or the end entity. If it is judged through the examination that the conditions for issuance of a public key certificate are satisfied, the request for issuance of a public key certificate made by the lower-level registration authority or end entity is transferred to the registration authority that ranks immediately above or the public key certificate issuer authority.

Furthermore, in an embodiment of the public key certificate issuance request processing system in accordance with the present invention, one hierarchical structure of registration authorities is composed of lower-level registration authorities that rank below one apical-level registration authority and end entities. The hierarchical structure processes a request for issuance of a public key certificate in compliance with a security policy that is adopted in common within the hierarchical structure of registration authorities.

Furthermore, in an embodiment of the public key certificate issuance request processing system in accordance with the present invention, each independent hierarchical structure of registration authorities is composed of lower-level registration authorities that rank below one apical-level registration authority and end entities. The independent hierarchical structure of registration authorities is different from any other independent hierarchical structure of registration authorities in terms of at least one of a group of end entities, a processing load, a geometric condition, and an organization.

Furthermore, in an embodiment of the public key certificate issuance request processing system in accordance with the present invention, each independent hierarchical structure of registration authorities is composed of lower-level registration authorities that rank below one apical-level registration authority and end entities. The independent hierarchical structure of registration authorities is different from any other independent hierarchical structure of registration authorities in terms of the capability of a registration authority of processing.

Furthermore, in an embodiment of the public key certificate issuance request processing system in accordance with the present invention, an uppermost registration authority included in the hierarchical structure of registration authorities manages a public key certificate as if to provide a directory service that identifies public key certificates issued from the public key certificate issuer authority to registration authorities or end entities.

Furthermore, in an embodiment of the public key certificate issuance request processing system in accordance with the present invention, a registration authority included in the hierarchical structure of registration authorities judges whether a lower-level registration authority that is an object of certification for the registration authority has made a request for issuance of a public key certificate in compliance with a security policy adopted within the hierarchical structure of registration authorities. If it is judged that the request for issuance of a public key certificate is made in compliance with the security policy, the request for issuance of a public key certificate is transferred to an upper-level registration authority that ranks immediately above the registration authority or the public key certificate issuer authority.

Furthermore, in an embodiment of the public key certificate issuance request processing system in accordance with the present invention, when registration authorities included in the hierarchical structure of registration authorities transfer data, the registration authorities certify mutually. If the mutual certification succeeds, the registration authorities transfer data.

Furthermore, in an embodiment of the public key certificate issuance request processing system in accordance with the present invention, when registration authorities included in the hierarchical structure of registration authorities transfer data, a data transmitting side appends a digital signature to data to be transferred. A data receiving side verifies the signature.

According to the second aspect of the present invention, there is provided a public key certificate issuance request processing method for issuing a public key certificate for an object of certification, which transfers data according to a public-key encryption technology, in response to a request for issuance.

The public key certificate issuance request processing method includes a step at which a request for issuance of a public key certificate made by an end entity or a registration authority that is an entity requesting a certificate is received and examined by a registration authority that ranks immediately above the requesting entity within a hierarchical structure of registration authorities. Herein, the hierarchical structure of registration authorities has at least two hierarchical levels, that is, has a public key certificate issuer authority ranked apically and end entities ranked lowermost.

Moreover, the public key certificate issuance request processing method includes a step at which if it is judged through the examination performed by the registration authority, which ranks immediately above, that the request for issuance of a public key certificate should be granted, the request for issuance of a public key certificate made by an entity requesting a certificate is transferred to the upper-level registration authority or the public key certificate issuer authority.

Furthermore, in an embodiment of the public key certificate issuance request processing method in accordance with the present invention, a registration authority included in the hierarchical structure of registration authorities judges whether a request for issuance of a public key certificate is made by a lower-level registration authority, which is an object of certification for the registration authority, in compliance with a security policy adopted within the hierarchical structure of registration authorities. If it is judged that the request for issuance of a public key certificate is made in compliance with the security policy, the request for issuance of a public key certificate is transferred to the upper-level registration authority that ranks immediately above or the public key certificate issuer authority.

Furthermore, in an embodiment of the public key certificate issuance request processing method in accordance with the present invention, when registration authorities included in the hierarchical structure of registration authorities transfer data, the registration authorities certify mutually. If the mutual certification succeeds, the registration authorities transfer data.

Furthermore, in an embodiment of the public key certificate issuance request processing method in accordance with the present invention, when registration authorities included in the hierarchical structure of registration authorities transfer data, a data transmitting side appends a digital signature to data to be transferred. A data receiving side verifies the signature.

Other purposes, features, and advantages of the present invention will be apparent from the description to be made later in relation to an embodiment of the present invention in conjunction with the appended drawings.

BRIEF DESCRIPTION OF THE DRAWINGS

FIG. 2 is an explanatory diagram showing the outline of a hierarchical structure of registration authorities accommodated by a public key certificate issuance request processing system in accordance with the present invention;

FIG. 3 is an explanatory diagram showing a reference example of the hierarchical structure of registration authorities accommodated by the public key certificate issuance request processing system in accordance with the present invention;

FIG. 4 describes a sequence of issuing a public key certificate to a lower-level registration authority accommodated by the public key certificate issuance request processing system in accordance with the present invention;

DESCRIPTION OF THE PREFERRED EMBODIMENTS

Figure 1:
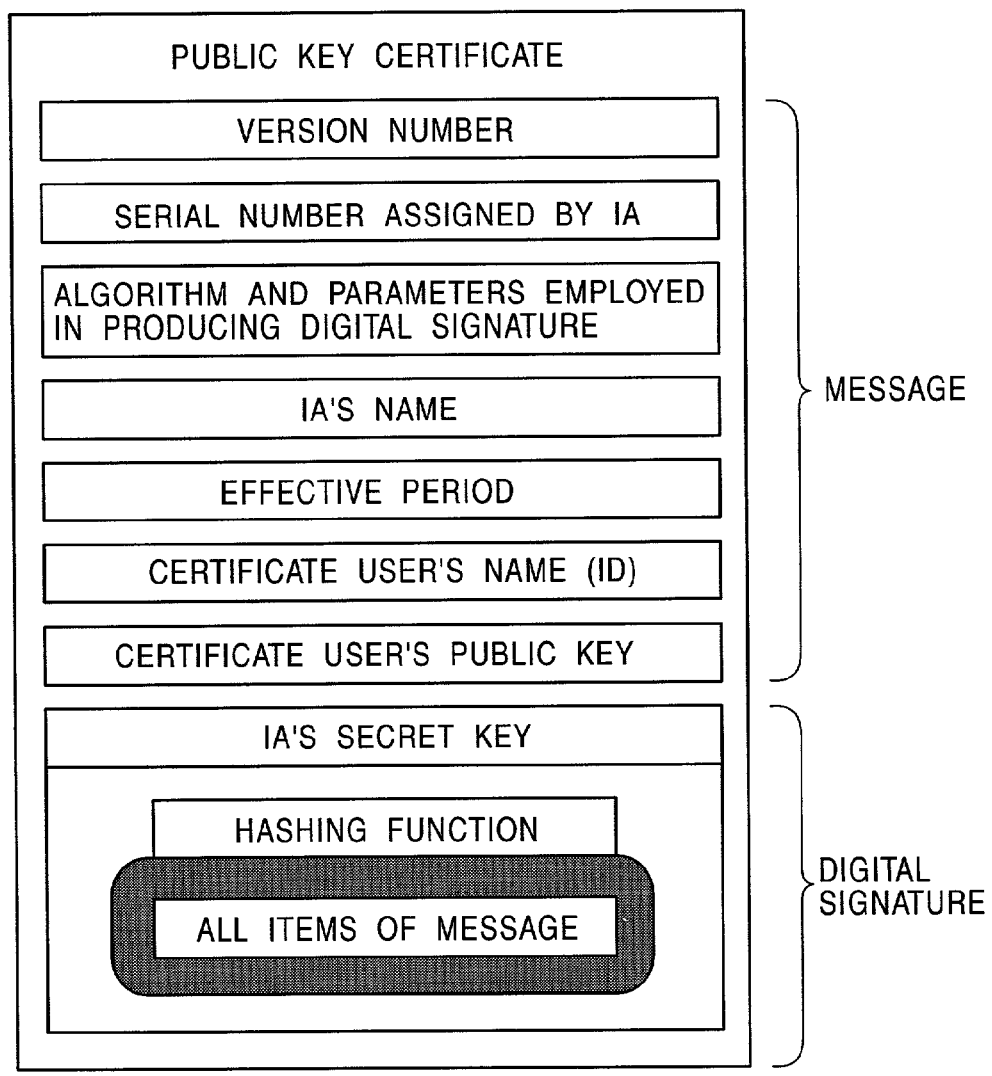
FIG. 1 shows an example of a public key certificate.

Referring to the drawings, an embodiment of a public key certificate issuance request processing system and a public key certificate issuance request processing method in accordance with the present invention will be described below.

FIG. 2 is an explanatory diagram showing the outline configuration of a public key certificate issuance request processing system in accordance with the present invention. Herein, the system means a logically integrated group of a plurality of apparatuses but does not care about whether the apparatuses are enclosed in one housing.

Referring to FIG. 2, end entities 204 that use a public key certificate are, for example, users, user devices, service providers that distribute contents or sell products over a network, or shops. The end entities 204 transmit encrypted data using a public key certificate or certify mutually.

End entities are controlled by a sub registration authority 203. The end entity 204 requests the sub registration authority 203 to issue a public key certificate for its own public key.

The sub registration authority 203 certifies an end entity (for example, a service provider that participates in a certain service or user's equipment). Furthermore, the sub registration authority 203 receives a request for issuance of a public key certificate for the public key used by the end entity 204. The sub registration authority then transmits the request for issuance of a public key certificate to a public key certificate issuer authority (IA) 201 via a system holder registration authority (SH RG) 202 that exists as an upper-level registration authority ranking above the sub registration authority 203.

The system holder registration authority 202 certifies each sub registration authority 203 that ranks below, and receives a request for issuance of a public key certificate made by a sub registration authority 203 that has been certified. A request for issuance of a public key certificate the system holder registration authority 202 receives is only a request for issuance of a public key certificate made by a sub registration authority 203 that has been certified by the system holder registration authority 202.

A system holder (SH) is an organization that holds or manages an Internet shop or market that is developed on the Internet, an organization that provides an infrastructure for communications through portable telephony, an organization that manages use of cables accommodated by a cable television system, or an entity that issues digital cash or electronic cards. The system holder is, for example, an organization that provides and manages an infrastructure of distribution of contents or services which enables provision of various kinds of contents or services, and that manages devices. The system holder controls or certifies one or more sub registration authorities that directly manage end entities. The system holder receives a request for issuance of a public key certificate, which is made by an end entity, via a sub registration authority that has certified the end entity, and transfers the received request to the public key certificate issuer authority 201.

Referring to FIG. 2, for example, a sub registration authority 203 receives a request for issuance of a public key certificate from an end entity 204, and transfers the request for issuance of a public key certificate to the public key certificate issuer authority 201 via an upper-level registration authority. The sub registration authority 203 then transmits a public key certificate issued from the public key certificate issuer authority 201 to the end entity 204.

As shown in FIG. 2, the registration authorities are divided into two hierarchical levels, that is, divided into the system holder registration authorities 202 and sub registration authorities 203. Alternatively, the registration authorities may be structured to have three or more hierarchical levels while including an uppermost-level registration authority that is the system holder registration authority 202. Each of intermediate-level registration authorities receives a request for issuance of a public key certificate, which is made by an end entity, via a registration authority that ranks immediately below the intermediate-level registration authority and that has certified the end entity. The intermediate-level registration authority then transfers the received request for issuance of a public key certificate to an upper-level registration authority that has certified the intermediate-level registration authority and ranks above.

An upper-level registration authority (RA) and lower-level registration authorities (RA) has relationships described below.

(1) The upper-level registration authority manages the lower-level registration authorities but does not manage end entities.

(2) A lowermost-level registration authority that ranks above end entities manages the end entities, for example, manages personal information of users or service providers that are the end entities. The lowermost-level registration authority receives a request for issuance of a public key certificate directly from an end entity.

(3) An uppermost-level registration authority that ranks immediately below an issuer authority (IA) manages public key certificates, for example, manages whether issued certificates are effective or ineffective. In other words, the uppermost-level registration authority included in a hierarchical structure of registration authorities manages public key certificates that the public key certificate issuer authority has issued to registration authorities or end entities as if to provide a directory service.

(4) The upper-level registration authority can charge the lower-level registration authority for processing of a request for issuance of a public key certificate.

As shown in FIG. 2, the hierarchical structure of registration authorities is such that a plurality of system holder registration authorities (SH RA) belongs to one issuer authority (IA), and a plurality of sub registration authorities (Sub RA) belong to one system holder registration authority. One group is constructed under one system holder registration authority and one subgroup is constructed under a lower-level sub registration authority.

A hierarchical structure that is a group headed by each of the system holder registration authorities or an independent hierarchical structure that is a group headed by each of the sub registration authorities is formed under any standard that stipulates, for example, a geographical condition, a provided service, a security policy, or an organization such as a company or corporate body. FIG. 3 lists an example of standards under which an independent hierarchical structure headed by a registration authority is formed.

Standard (1) stipulates a group of end entities to be managed. Standard (2) stipulates a security policy under which one hierarchical structure headed by a system holder registration authority is formed. For example, one hierarchical structure is formed with end entities and registration authorities that mutually communicate using certain encryption. When hierarchical structures are formed under this standard, entities that have different security policies can be excluded. In other words, one hierarchical structure of registration authorities composed of lower-level registration authorities that rank below one apical-level registration authority and end entities processes a request for issuance of a public key certificate in compliance with a security policy adopted in common within the hierarchical structure of registration authorities.

Standard (3) stipulates scalability under which a hierarchical structure is formed. For example, when the number of managed end entities exceeds a predetermined value, a hierarchical structure headed by a new registration authority is formed. A registration authority that heads one hierarchical structure must process a larger number of requests for issuance of a public key certificate along with an increase in the number of registration authorities that ranks below or end entities. An increase in an amount of processing can be suppressed by limiting the number of managed entities. Consequently, cost-efficient use of the system is achieved.

Standard (4) stipulates geographical classification under which hierarchical structures are formed in units of a nation such as Japan or the U.S. or a predetermined region such as east Japan or west Japan. Standard (5) stipulates functional classification under which a hierarchical structure is formed with end entities headed by a registration authority that merely updates an issued public key certificate. Otherwise, under functional classification, a hierarchical structure is formed with end entities headed by a registration authority that merely receives a request for issuance of a new public key certificate. When this standard is adopted, end entities may belong to a plurality of hierarchical structures. Standard (6) stipulates an organization under which one hierarchical structure is formed in units of, for example, a company, a plurality of affiliated companies, a corporate body, or a user that has dealings with a specific financial organization. As mentioned above, registration authorities are hierarchically structured under any of various standards.

In a hierarchical structure of registration authorities formed under any of the various standards, a registration authority included in the hierarchical structure certifies registration authorities that rank immediately below or end entities. The registration authority examines or receives a request for issuance of a public key certificate made by a registration authority that ranks immediately below or an end entity. If it is judged through the examination that the conditions for issuance of a public key certificate are met, the request for issuance of a public key certificate made by the lower-level registration authority or end entity is transferred to a registration authority that ranks immediately above or to the public key certificate issuer authority.

A process of issuing a public key certificate will be described below. There are broadly two modes of issuance of a public key certificate.

(1) In one of the modes, an upper-level registration authority (RA) issues a public key certificate to lower-level registration authorities (RA).

(2) In the other mode, an uppermost-level registration authority (RA) issues a public key certificate to end entities.

To begin with, the mode (1) in which an upper-level registration authority (RA) issues a public key certificate to lower-level registration authorities (RA) will be described with reference to FIG. 4.

Referring to FIG. 4, processing proceeds in ascending numerical order from (1) to (10). Herein, the numerals (1 to 10) shall denote processing stages. To begin with, in stage (1), an upper-level registration authority (RA) and a lower-level registration authority (RA) discuss and determine the rules for use. Herein, the registration authorities determine the rules for use for the purpose of clarifying the contents of processing the upper-level registration authority performs and the power of the upper-level registration authority, and also clarifying the contents of processing the lower-level registration authority performs and the power of the lower-level registration authority. Thus, the ranges of responsibility the registration authorities assume are clarified. For example, the lower-level registration authority is responsible for checking if an end entity is reliable, guaranteeing that the end entity is reliable, and transferring a request for issuance of a public key certificate made by the end entity to the upper-level registration authority. On the other hand, the upper-level registration authority receives the request for issuance of a public key certificate made by the lower-level registration authority, guarantees that the request for issuance of a public key certificate is made by the reliable lower-level registration authority, and transfers the request for issuance of a public key certificate to the issuer authority (IA) or an upper-level registration authority. By determining the rules of use, the powers of processing of the registration authorities are clarified. Once the rules for use are determined, the upper-level registration authority registers the information of the lower-level registration authority in stage (2).

Through stages (1) and (2), the upper-level registration authority and lower-level registration authority are hierarchically structured. Thereafter, the lower-level registration authority produces a pair of an own public key and secret key in stage (3). In stage (4), the lower-level registration authority requests the upper-level registration authority to issue a public key certificate for the produced public key.

In receipt of the request for issuance of a public key certificate made by the lower-level registration authority, in stage (5), the upper-level registration authority checks if the lower-level registration authority has been registered and examines and verifies if the lower-level registration authority is reliable. If it is judged that the lower-level registration authority that has issued the request for issuance of a public key certificate has already been registered and is reliable, the upper-level registration authority requests the issuer authority (IA) to issue a public key certificate in stage (6).

In stage (7), the issuer authority produces a public key certificate in response to the request made by the upper-level registration authority, and signs the public key certificate using an own secret key. In stage (8), the issuer authority issues the public key certificate to the upper-level registration authority. In stage (9), the upper-level registration authority issues the public key certificate received from the issuer authority to the lower-level registration authority. The lower-level registration authority stores the issued public key certificate in stage (10).

According to the foregoing sequence, the request for issuance of a public key certificate made by the lower-level registration authority is sent to the issuer authority via the upper-level registration authority. The issued public key certificate is sent to the lower-level registration authority via the upper-level registration authority and stored in the lower-level registration authority.

In the sequence shown in FIG. 4, the request for issuance of a public key certificate made by the lower-level registration authority that is an entity requesting issuance of a public key certificate is received by the upper-level registration authority that ranks immediately above the requesting entity. The upper-level registration authority then examines the request for issuance of a public key certificate. If it is judged through the examination that the request for issuance of a public key certificate should be granted, the request for issuance of a public key certificate is transferred to the upper-level registration authority or public key certificate issuer authority.

Figure 5:
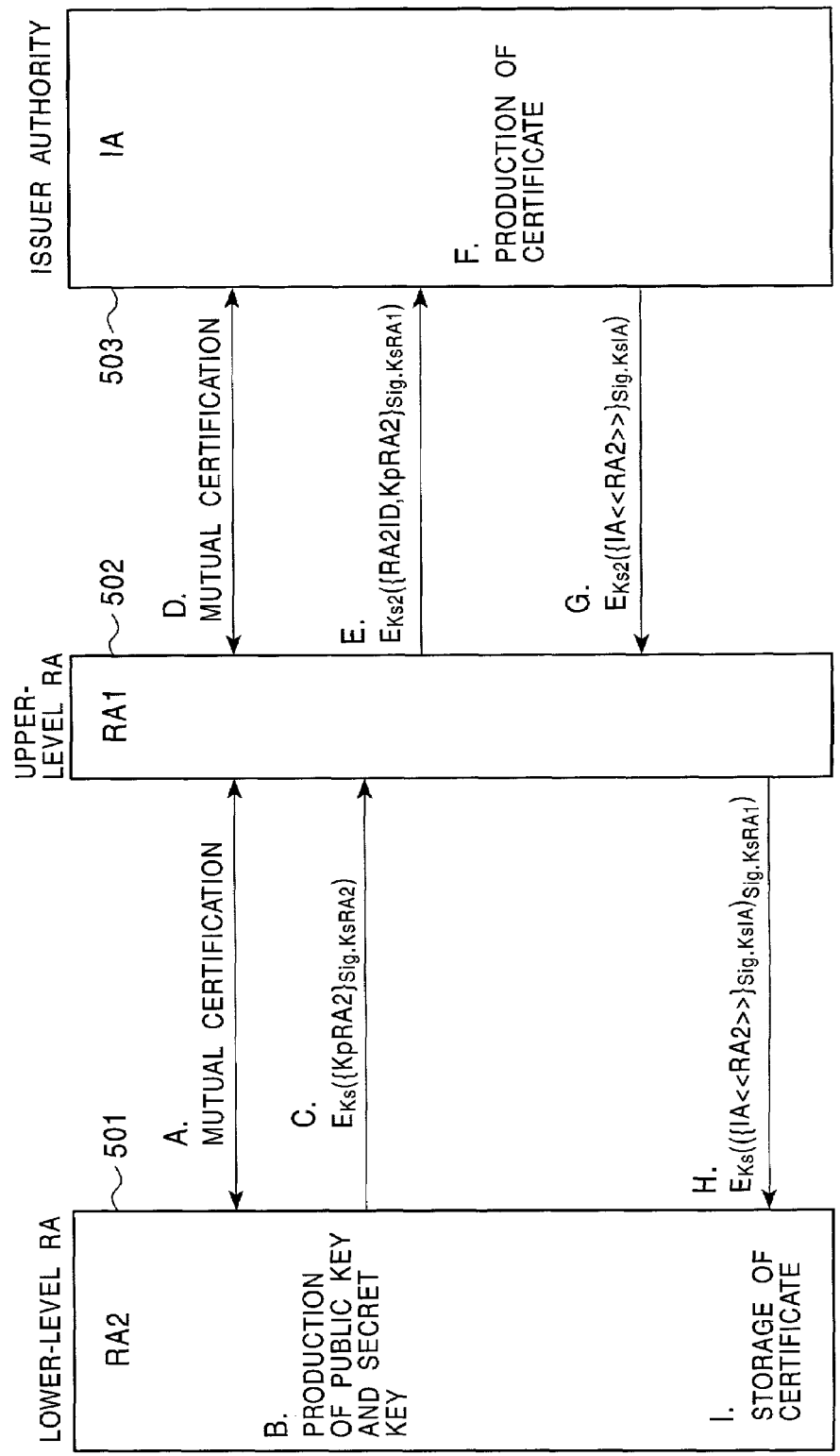
FIG. 5 shows data that is treated according to the sequence of issuing a public key certificate to a lower-level registration authority accommodated by the public key certificate issuance request processing system in accordance with the present invention.

Data to be transferred during issuance of a public key certificate will be described concretely in conjunction with FIG. 5. In FIG. 5, processing proceeds in alphabetical order from A to I. Herein, the alphabets A to I denote processing stages.

First, a lower-level registration authority (RA2) 501 and an upper-level registration authority (RA1) 502 certify mutually. This is achieved using a mutual certification key (initially embedded key) stored in advance in memories in both the lower-level registration authority 501 and upper-level registration authority 502.

Figure 6:
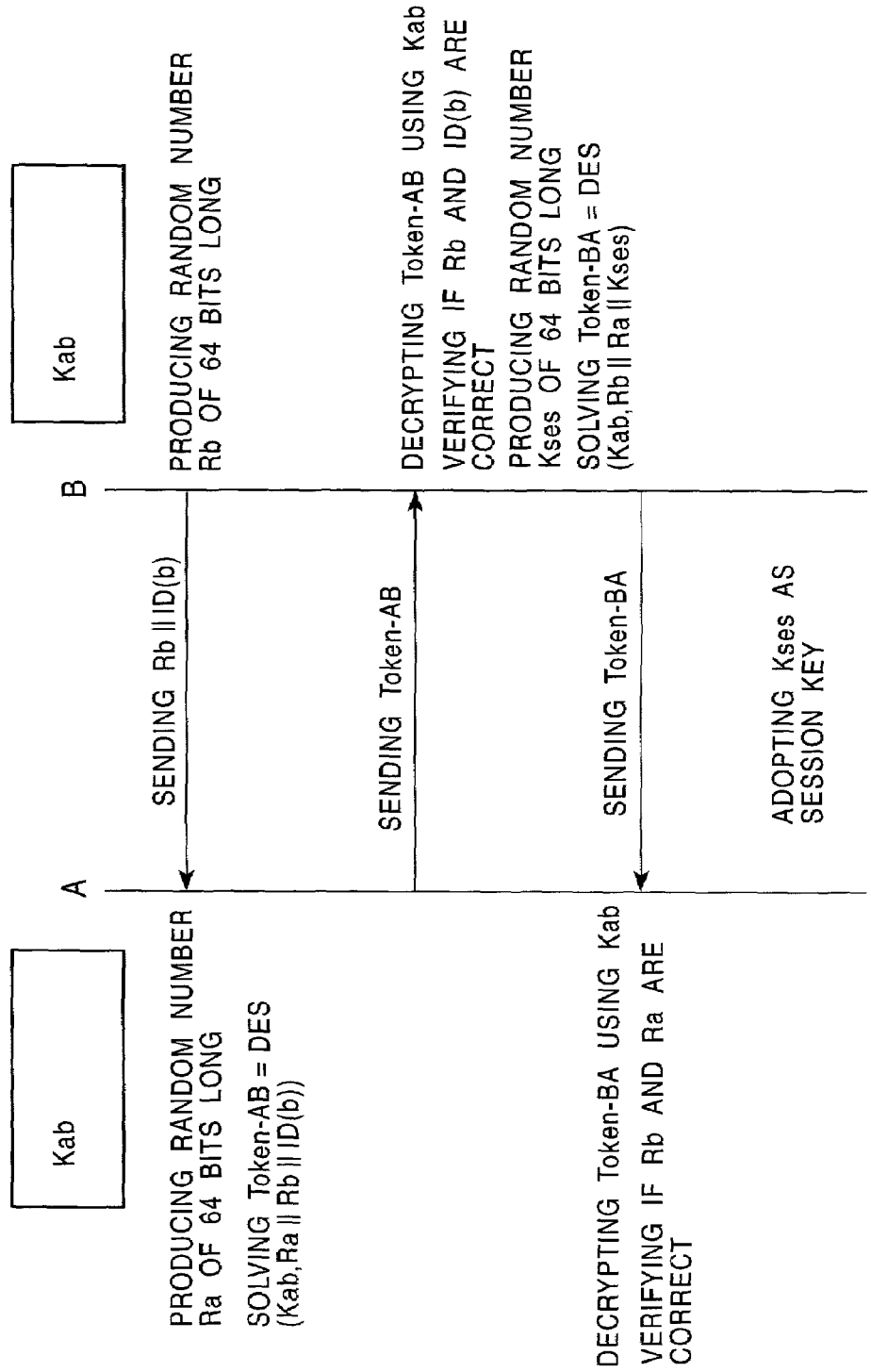
FIG. 6 is an explanatory diagram concerning mutual certification that is performed using common key/object key encryption applicable to the public key certificate issuance request processing system in accordance with the present invention.

A mutual certification method based on a common-key encryption technology will be described in conjunction with FIG. 6. Referring to FIG. 6, the data encryption standard (DES) is adopted as the common-key encryption technology. Alternatively, any other common-key encryption technology will do.

First, entity B produces a random number Rb of 64 bits long, and transmits the random number Rb together with an own identifier (ID) (ID(b)) to entity A. In receipt of the random number Rb, entity A produces a new random number Ra of 64 bits long, encrypts Ra, Rb, and ID(b) in that order in a CBC mode defined in the DES using a key Kab, and returns them to entity B.

Entity B having received the data decrypts the received data using the key Kab. A method of decrypting the received data will be described below. Namely, first, cipher text E1 is decrypted using the key Kab in order to produce a random number Ra. Thereafter, cipher text E2 is decrypted using the key Kab. The exclusive OR of the resultant cipher text and cipher text E1 is calculated, whereby Rb is worked out. Finally, cipher text E3 is decrypted using the key Kab. The exclusive OR of the resultant cipher text and cipher text E2 is calculated, whereby ID(b) is worked out. It is then verified whether among the thus calculated Ra, Rb, and ID(b), Rb and ID(b) agree with what are sent from entity B. If Rb and ID(b) agree with what are sent from entity B, entity B certifies that entity A is valid.

Thereafter, entity B produces a session key Kses that is used after certification is completed (a random number is used to produce the session key). Rb, Ra, and Kses are then encrypted in that order in the CBC mode defined in the DES using the key Kab, and returned to entity A.

In receipt of the data, entity A decrypts the received data using the key Kab. A method of decrypting the received data is identical to the method adopted by entity B. The description of the method is therefore omitted. It is then verified whether Rb and Ra out of the thus calculated Rb, Ra, and Kses agree with what are sent from entity A. If Rb and Ra agree with what are sent from entity A, the session key Kses is used as a common key for secret communication that is performed after certification is completed.

If forgery or disagreement is found during verification of the received data, processing is suspended by reason of a failure in mutual certification.

If mutual certification succeeds, the lower-level registration authority 501 produces an own public key and secret key, signs the public key KpRA2 using the own secret key, and encrypts the public key using the session key Ks. Data EKs ({KpRa2}sig.KsRA2) is thus produced and transmitted to the upper-level registration authority 502. In receipt of the data, the upper-level registration authority 502 verifies the signature appended to the data. After it is confirmed that the data is not forged, the public key certificate issuer authority 503 is requested to issue a certificate to the lower-level registration authority 501.

Figure 7:
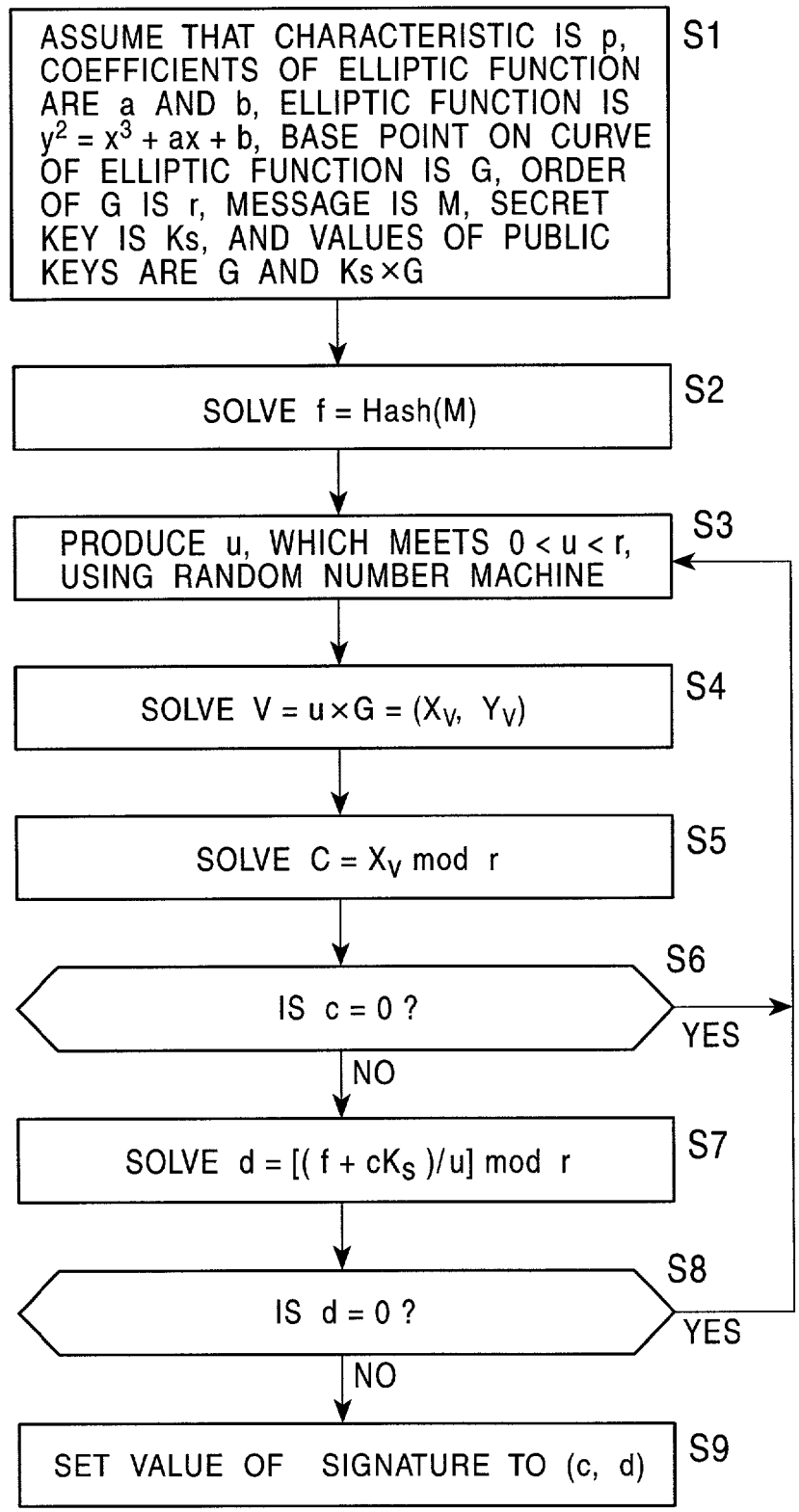
FIG. 7 is an explanatory diagram concerning signature creation applicable to the public key certificate issuance request processing system in accordance with the present invention.

A method of producing a digital signature using the public-key encryption technology will be described in conjunction with FIG. 7. FIG. 7 describes a flow of producing a digital signature using an elliptic curve digital signature algorithm (EC-DSA) (IEEE P1363/D3). Herein, elliptic curve cryptography (ECC) is adopted as a public-key encryption technology. Incidentally, as far as the data processing system in accordance with the present invention is concerned, for example, the RSA (which stands for Rivest, Shamir, and Adleman) technology that is a similar public-key encryption technology may be adopted rather than the elliptic curve cryptography.

Referring to FIG. 7, steps will be described below. At step S1, it is assumed that a characteristic is p, coefficients employed in an elliptic function (that is, $y^2=x^3+ax+b$) are a and b, a base point on a curve of the elliptic function is G, the order of G is r, and a secret key is Ks ($0<Ks<r$). At step S2, a hash value of a message M is calculated, and defined as $f=Hash(M)$.

Now, a method of calculating a hash value using a hashing function will be described. The hashing function is a function that is applied to a message that is compressed to have a predetermined bit length. The resultant value is provided as a hash value. The hashing function is characterized in that when one bit of data to which the hashing function is applied is varied, many bits of a hash values change, and that it is hard to distinguish different data items, from which the same hash value is calculated, from each other. MD4, MD5, or SHA-1 may be adopted as the hashing function. Otherwise, DES-CBC may be employed. In this case, a MAC (check value comparable to ICV) that is provided finally is a hash value.

At step S3, a random number u ($0<u<r$) is produced. At step S4, coordinates V(Xv, Yv) are calculated by multiplying the coordinates representing the base point by u. Summation of coordinates representing two points on the curve of the elliptic function, and doubling of coordinates representing a point thereon are defined as follows:

Assuming that P=(Xa, Ya), Q=(Xb, Yb), and R=(Xc, Yc)=P+Q are established, if P≠pQ is true, addition is defined as follows:

$Xc=\lambda^2-Xa-Xb$ $Yc=\lambda\cdot(Xa-Xc)-Ya$ $\lambda=(Yb-Ya)/(Xb-Xa)$

If P=Q is true, doubling is defined as follows:

$Xc=\lambda^2-2Xa$ $Yc=\lambda\cdot(Xa-Xc)-Ya$ $\lambda=(3(Xa)^2+a)/(2Ya)$

Based on the above definitions, a product of G by u is calculated. The most easy-to-understand arithmetic method is such that: G, 2G, 4G, etc. are worked out, u is developed in binary notation; and values of $2^iG$ (G is doubled i times where i denotes a bit position of bit 1 in u relative to the most significant bit thereof) are summed up.

At step S5, c=Xvmod r is worked out. It is judged at step S6 whether the value c is 0. If not, d=[(f+cKs)/u]mod r is worked out. It is judged at step S8 whether the value d is 0. If not, the values c and d are provided as a digital signature at step S9. Supposing r has a length of 160 bits, the digital signature is 320 bits long.

If it is judged at step S6 that the value c is 0, control is returned to step S3. A new random number is produced. Likewise, if it is judged at step S8 that the value d is 0, control is returned to step S3. A new random number is then produced.

Figure 8:
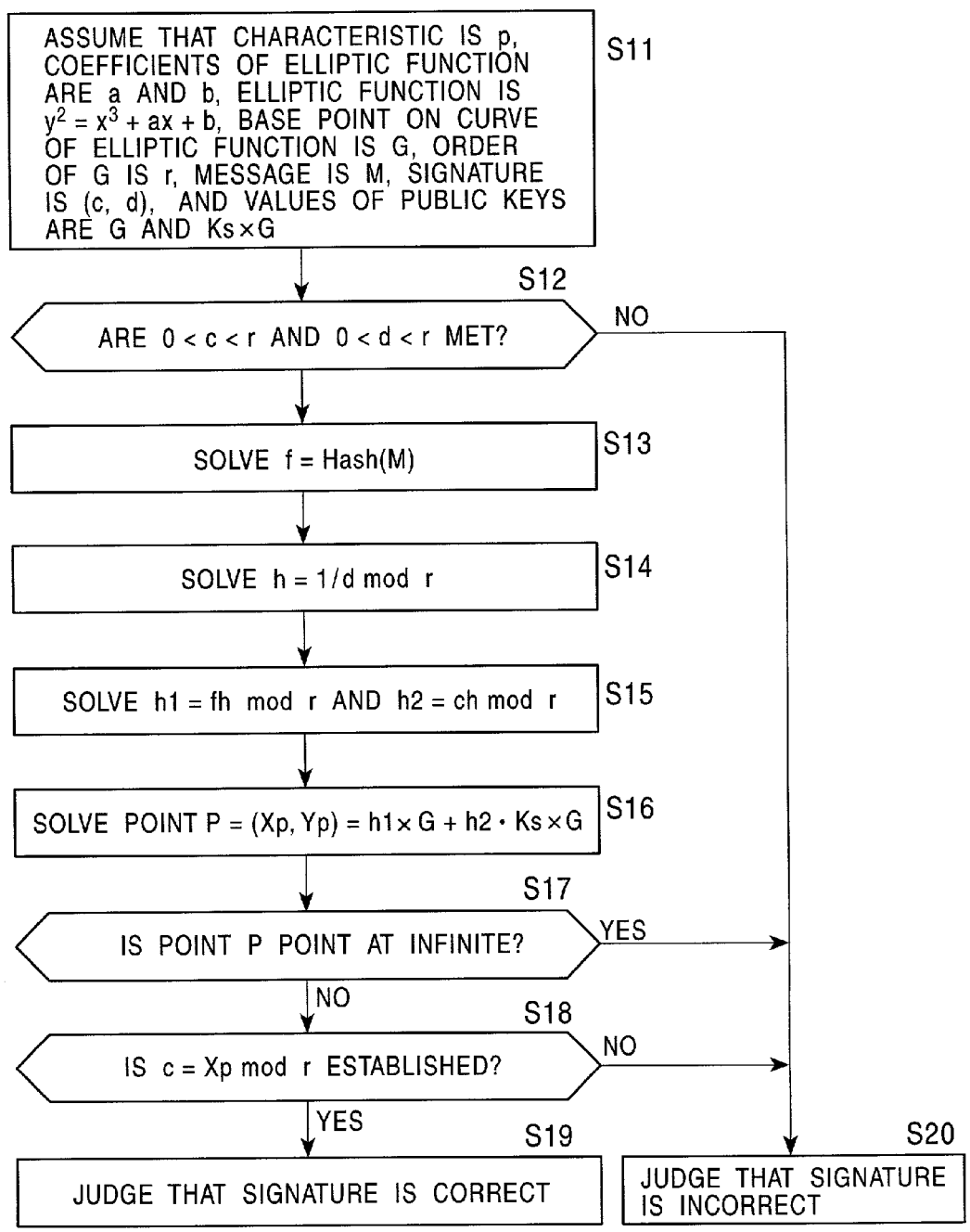
FIG. 8 is an explanatory diagram concerning signature verification applicable to the public key certificate issuance request processing system in accordance with the present invention.

Next, a method of verifying a digital signature according to a public-key encryption technology will be described in conjunction with FIG. 8. At step S12, it is assumed that a message is M, a characteristic is p, coefficients of an elliptic function (that is $y^2=x^3+ax+b$) are a and b, a base point on a curve of the elliptic function is G, the order of G is r, and values constituting a public key are G and KsG (where 0<Ks<r). At step S12, it is verified whether values constituting a digital signature, c and d, meet the conditions 0<c<r and 0<d<r. If c and d meet the conditions, a hash value of the message M is worked out at step S13, and defined as f=Hash(M). At step S14, h=1/d mod r is worked out. At step S15, h1=fh mod r and h2=ch mod r are worked out.

At step S16, the calculated h1 and h2 are assigned to P (point)=(Xp, Yp)=h1G+h2·KsG in order to work out the coordinates of point P. A verifier who verifies a digital signature knows the public key values G and KsG, and can therefore calculate a scalar product of coordinates representing points on the curve of the elliptic function in the same manner as that at step S4 described in FIG. 7. It is then judged at step S17 whether point P is a point at infinity. If not, control is passed to step S18. In reality, whether point P is a point at infinity is judged at step S16. Namely, when the coordinates (X, Y) representing point P and the coordinates (X, −Y) representing point Q are summed up, λ is not worked out. This demonstrates that the sum of the coordinates representing points P and Q represents a point at infinity. At step S18, Xp mod r is worked out and compared with the value c included in the digital signature. Finally, if both the values agree with each other, control is passed to step S19. It is then judged that the digital signature is correct.

If it is judged that a digital signature is correct, it means that the data of the message is not forged. It is confirmed that a person who owns a secret key associated with a public key has produced the digital signature.

If it is judged at step S12 that the value included in the digital signature, c or d, does not meet the condition 0<c<r or 0<d<r, control is passed to step S20. If it is judged at step S17 that point P is a point at infinity, control is passed to step S20. If it is judged at step S18 that Xp mod r disagrees with the value c included in the digital signature, control is passed to step S20.

If it is judged at step S20 that the digital signature is incorrect, it means that the data of the message is forged or a person who has produced the digital signature is not a person who owns a secret key associated with the public key.

Referring back to FIG. 5, the description of issuance of a public key certificate to the lower-level registration authority will be continued. As mentioned above, if it is confirmed through verification of the digital signature that the data of the message is not forged, the upper-level registration authority 502 and public key certificate issuer authority 503 certify mutually.

If the mutual certification succeeds, the upper-level registration authority 502 uses its own secret key to sign an identifier RA2ID assigned to the lower-level registration authority 501 and a public key KpRA2 produced by the lower-level registration authority 501. The upper-level registration authority 502 encrypts the resultant identifier and public key using a session key Ks2 produced during the mutual certification so as to produce $E_{Ks2}$ ({RA2ID, KpRA2}$_{Sig\text{-}KsRA1}$). The upper-level registration authority 502 then transmits $E_{Ks2}$ to the public key certificate issuer authority 503.

The public key certificate authority 503 decrypts the received data $E_{Ks2}$ ({RA2ID, KpRA2}$_{Sig\text{-}KsRA1}$) so as to produce a public key certificate for the lower-level registration authority 501. The public key certificate authority 503 then signs the produced public key certificate IA<<RA2>> using a secret key KsIA that is produced by the public key certificate issuer authority 503. The public key certificate authority 503 then encrypts the resultant public key certificate using a session key Ks2, which is produced during the mutual certification, so as to produce data $E_{Ks2}$ ({IA<<RA2>>}$_{Sig\text{-}KsIA}$). The data $E_{Ks2}$ is then transmitted to the upper-level registration authority 502. The upper-level registration authority 502 checks the signature. Moreover, the upper-level registration authority 502 signs the data $E_{Ks2}$ using an own secret key, and encrypts the resultant data using a session key (produced during the mutual certification achieved between the lower-level registration authority 501 and upper-level registration authority 502). The resultant data is transmitted to the lower-level registration authority 501. The lower-level registration authority 501 decrypts the received data using the session key, verifies the signature, and then stores the data that is the public key certificate.

As mentioned above, mutual certification and data transfer are performed between a lower-level registration authority and an upper-level registration authority. A public key certificate granted to the lower-level registration authority is then issued.

Next, a sequence according to which a lowermost-level registration authority issues a public key certificate to an end entity, that is, a sequence of issuing a public key certificate for an end entity's public key will be described in conjunction with FIG. 9.

Figure 9:
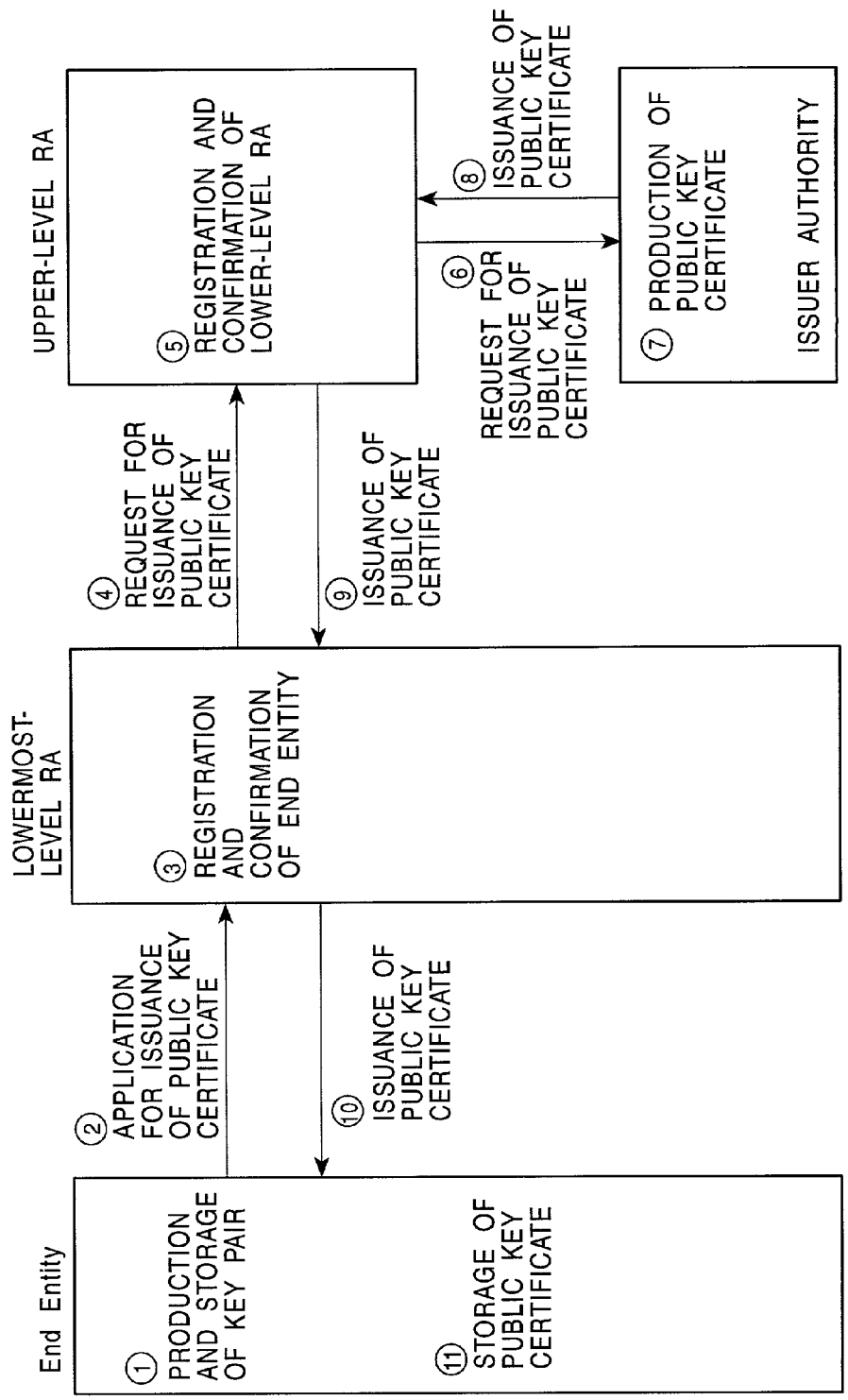
FIG. 9 shows a sequence of issuing a public key certificate to an end entity accommodated by the public key certificate issuance request processing system in accordance with the present invention.

FIG. 9 describes processing that proceeds in ascending numerical order from (1) to (11). The numbers (1) to (11) shall denote stages. First, in stage (1), an end entity produces a pair of an own public key and secret key. In stage (2), the end entity requests a lowermost-level registration authority to issue a public key certificate for the produced public key.

The lowermost-level registration authority receives a request for issuance of a public key certificate from the end entity. In stage (3), the end entity is registered and examined to see if the end entity is a reliable object of issuance of a public key certificate. In stage (4), if the lowermost-level registration authority judges that the end entity having made the request for issuance of a public key is reliable, the lowermost-level registration authority transfers the request for issuance of a public key received from the end entity to an upper-level registration authority.

In receipt of the request for issuance of a public key certificate made by the lower-level registration authority, the upper-level registration authority checks in stage (5) if the lower-level registration authority has made the request in compliance with the rules for use. For example, the upper-level registration authority examines to see if the request for issuance of a public key certificate has been made with the reliability of the end entity guaranteed. If it is confirmed that the request has been made in compliance with the rules for use, the upper-level registration authority requests the issuer authority to issue a public key certificate in stage (6).

In stage (7), the issuer authority produces a public key certificate in response to the request made by the upper-level registration authority, and signs the produced public key certificate using the own secret key. In stage (8), the issuer authority issues the public key certificate to the upper-level registration authority. In stage (9), the upper-level registration authority issues the public key certificate received from the issuer authority to the lower-level registration authority. In stage (10), the lower-level registration authority transmits the issued public key certificate to the end entity. In stage (11), the end entity stores the issued public key certificate.

According to the foregoing sequence, a request for issuance of a public key certificate made by an end entity is sent to an issuer authority via a lower-level or upper-level registration authority, and then stored in the lower-level or upper-level registration authority.

During the processing described in FIG. 9, the request for issuance of a public key certificate made by the end entity that is an entity requesting issuance of a public key certificate is received by the lowermost-level registration authority that ranks immediately above the requesting entity. The lowermost-level registration authority then examines the end entity. Consequently, if it is judged that the request for issuance of a public key certificate should be granted, the request for issuance of a public key certificate is transferred to the upper-level registration authority.

Figure 10:
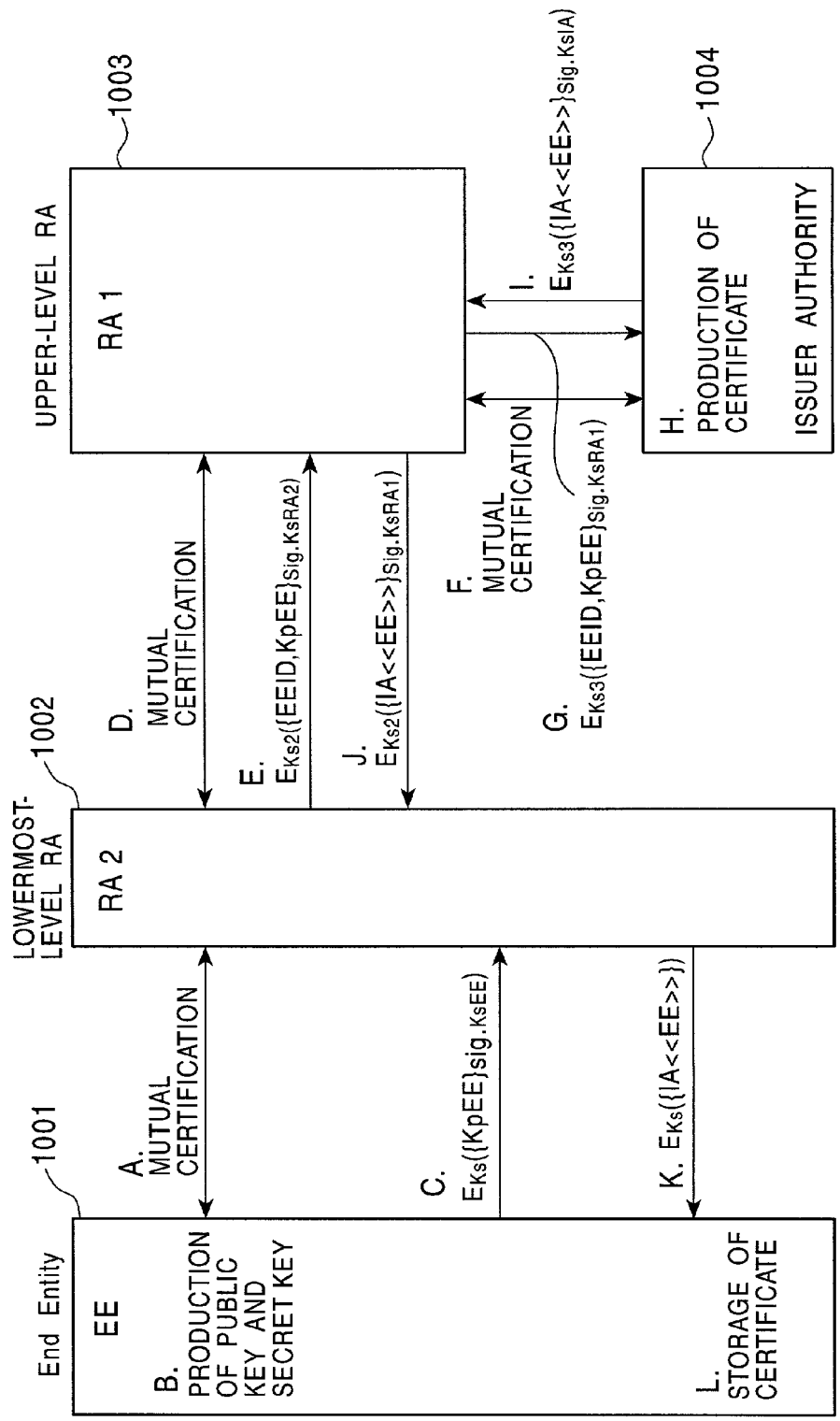
FIG. 10 shows the details of data that is treated according to the sequence of issuing a public key certificate to an end entity accommodated by the public key certificate issuance request processing system in accordance with the present invention.

Data to be transferred during issuance of a public key certificate will be described concretely in conjunction with FIG. 10. Referring to FIG. 10, processing proceeds in alphabetical order from A to L. Herein, the alphabets shall denote processing stages.

First, an end entity 1001 and a lowermost-level registration authority (RA2) 1002 certify mutually. This is achieved by, for example, utilizing a mutual certification key (initially embedded key) stored in advance in memories in the end entity 1001 and lowermost-level registration authority 1002.

If the mutual certification succeeds, the end entity 1001 produces an own public key and secret key, signs the public key KpEE using the secret key, and encrypts the resultant public key using a session key so as to produce data $E_{Ks}$ ($\{KpEE\}_{Sig\text{-}KsEE}$). The data $E_{Ks}$ is then transmitted to the lowermost-level registration authority 1002. In receipt of the data, the lowermost-level registration authority 1002 verifies the signature. The lowermost-level registration authority 1002 and an upper-level registration authority that transfers a request for issuance of a public key made by an end entity certify mutually. The mutual certification may be achieved according to the aforesaid common-key encryption technology or a public-key encryption technology that utilizes a public key certificate.

Figure 11:
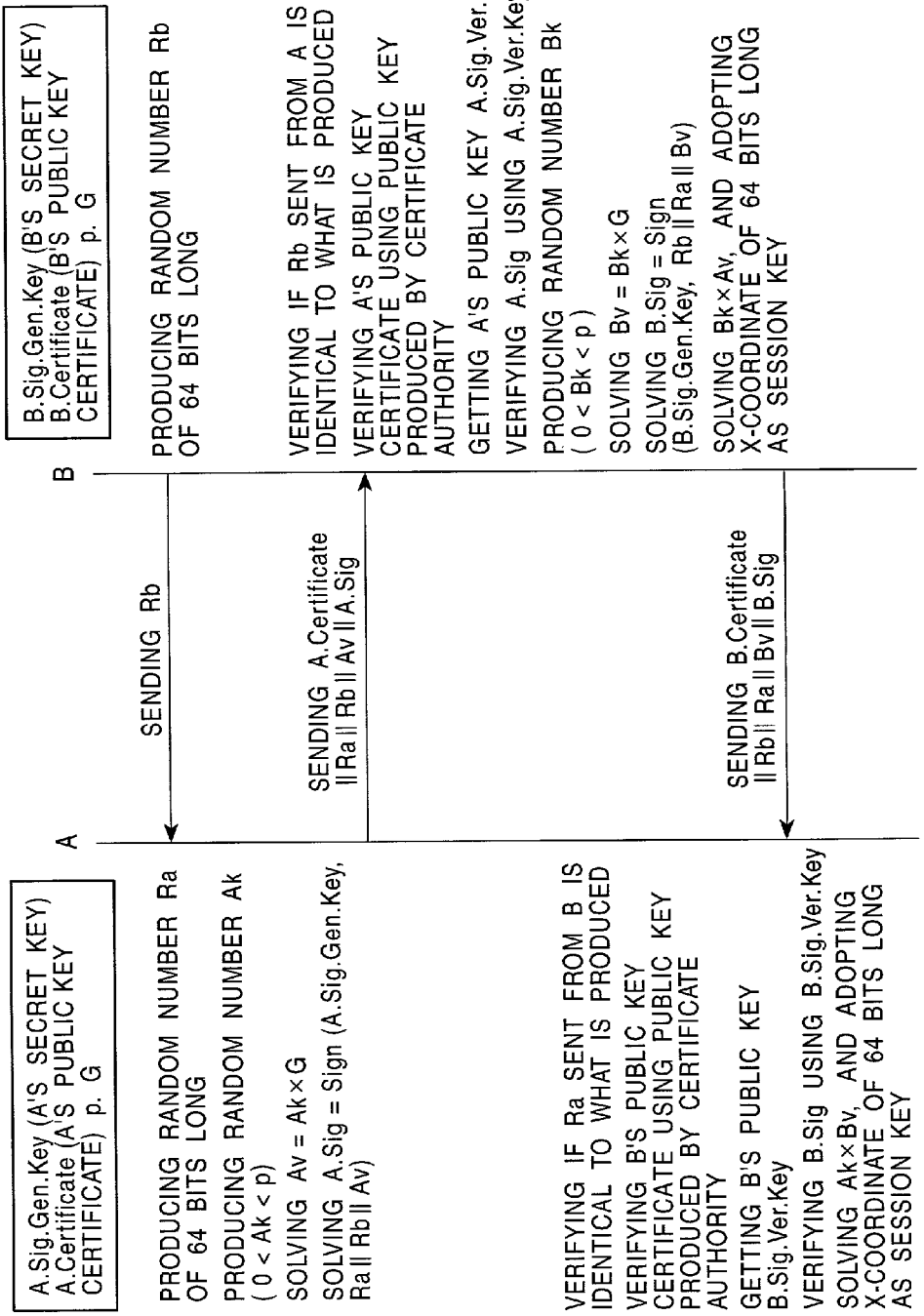
FIG. 11 is an explanatory diagram concerning mutual certification based on public key encryption which is applicable to the public key certificate issuance request processing system in accordance with the present invention.

FIG. 11 describes a sequence of mutual certification that utilizes the elliptic curve cryptography which is a public-key encryption technology and which utilizes a key of 160 bits long. Referring to FIG. 11, the ECC is adopted as the public-key encryption technology. Alternatively, any other similar public-key encryption technology will do. Moreover, the key employed may not be 160 bits long. Referring to FIG. 11, first, entity B produces a random number Rb of 64 bits long and transmits the random number to entity A. In receipt of the random number, entity A produces a new random number Ra of 64 bits long and a random number Ak that is smaller than a characteristic p. Coordinates representing a base point G are multiplied by Ak, thus producing the coordinates representing point Av=Ak×G. A digital signature A.Sig is produced using the random numbers Ra and Rb and the X and Y coordinates representing point Av, and then returns together with a public key certificate granted to entity A to entity B. The random numbers Ra and Rb are 64 bits long, and the X and Y coordinates representing point Av are 160 bits long. Therefore, the digital signature produced is 448 bits long.

In order to utilize a public key certificate, a user uses an own public key, which is produced by a public key certificate issuer authority, to verify a digital signature appended to the public key certificate. After the user succeeds in verifying the digital signature, the user fetches a public key from the public key certificate and utilizes the public key. Therefore, all users who utilize the public key certificate must own the common public key produced by the public key certificate issuer authority.

Referring back to FIG. 11, entity B that has received the public key certificate granted to entity A, the random numbers Ra and Rb, the coordinates representing point Av, and the digital signature A.Sig verifies if Rb sent from entity A agrees with what is produced by entity B. If the random numbers agree with each other, the digital signature appended to the public key certificate granted to entity A is verified using a public key produced by a certificate authority. The entity A's public key is then fetched. The fetched entity A's public key is used to verify the digital signature A.Sig. After the verification of the digital signature succeeds, entity B certifies that entity A is valid.

Thereafter, entity B produces a random number Bk that is smaller than a characteristic p. Coordinates representing the base point G are multiplied by Bk, thus producing the coordinates representing point Bv=Bk×G. A digital signature B.Sig is then produced using the random numbers Rb and Ra and the X and Y coordinates representing point Bv. The digital signature B.Sig is returned together with a public key certificate granted to entity B to entity A.

Entity A having received the entity B's public key certificate, the random numbers Rb and Ra, the coordinates representing point Av, and the digital signature B.Sig verifies whether Ra sent from entity B agrees with what is produced by entity A. Consequently, if the random numbers agree with each other, the digital signature appended to the entity B's public key certificate is verified using a public key produced by the certificate authority. An entity B's public key is then fetched. The fetched entity B's public key is used to verify the digital signature B.Sig. After the verification of the digital signature succeeds, entity A certifies that entity B is valid.

If both the entities succeed in certification, entity B solves Bk×Av. Herein, Bk denotes a random number and Av denotes a point on the curve of the elliptic function. The scalar produce of coordinates representing the point on the curve of the elliptic function must therefore be worked out. Entity A solves Ak×Bv, and adopts the low-order 64 bits of the X coordinates of the coordinates representing points Ak and Bv as a session key for subsequent communication. At this time, a common-key encryption technology utilizing a key of 64 bits long shall be adopted. Needless to say, the session key may be produced using the Y coordinates of the coordinates representing points Ak and Bv, and the bits of the Y coordinates adopted as the session key may not be the low-order 64 bits. In secret communication succeeding mutual certification, transmitted data is encrypted using the session key. Besides, the digital signature may be appended to the resultant data.

During verification of the digital signature or received data, if forgery or disagreement is detected, processing is suspended by reason of a failure in mutual certification.

In the mutual certification, the produced session key is used to encrypt transmitted data and communicate the data between the entities.

Referring back to FIG. 10, a description will be continued. After the lowermost-level registration authority 1002 and upper-level registration authority 1003 certify mutually, the lowermost-level registration authority 1002 transfers the request for issuance of a public key certificate made by the end entity 1001 to the upper-level registration authority 1003.

The lowermost-level registration authority 1002 signs the public key KPEE sent from the end entity 1001 and the identifier EEID of the end entity 1001 using the own secret key. The lowermost-level registration authority 1002 then encrypts the resultant public key and identifier using a session key so as to produce data $E_{Ks2}$ ({EEID, KpEE}$_{Sig-KsRA2}$), and transmits the data to the upper-level registration authority 1003. In receipt of the data, the upper-level registration authority 1003 and public key certificate issuer authority 1004 certify mutually. Thereafter, the upper-level registration authority 1003 requests the public key certificate issuer authority 1004 to issue a public key certificate to the end entity 1001. The upper-level registration authority 1003 signs the identifier EEID of the end entity 1001 and the public key KPEE thereof using the own secret key. The upper-level registration authority 1003 encrypts the data using a session key produced during the mutual certification so as to produce $E_{Ks3}$ ({EEID, KpEE}$_{Sig-KsRA1}$), and transmits the data $E_{Ks3}$ to the public key certificate issuer authority 1004.

The public key certificate issuer authority 1004 decrypts the received data $E_{Ks3}$ ({EEID, KpEE}$_{Sig-KsRA1}$) so as to produce a public key certificate for the end entity 1001. The public key certificate issuer authority 1004 signs the produced public key certificate IA<<EE>> using its own secret key KsIA, and encrypts the public key certificate using a session key Ks3 that is produced during the mutual certification so as to produce data $E_{Ks3}$ ({IA<<EE>>}$_{Sig-KsIA}$). The data $E_{Ks3}$ is then transmitted to the upper-level registration authority 1003. The upper-level registration authority 1003 examines the appended signature, and signs the received data using its own secret key. The upper-level registration authority 1003 then encrypts the resultant data using a session key (that is produced during the mutual certification performed between the lowermost-level registration authority 1002 and upper-level registration authority 1003) so as to produce data $E_{Ks2}$ ({IA<<EE>>}$_{Sig-KsRA1}$), and transmits the data $E_{Ks2}$ to the lowermost-level registration authority 1002. The lowermost-level registration authority 1002 examines the appended signature, and signs the received data using it own secret key. The lowermost-level registration authority 1002 then encrypts the data using a session key (which is produced during the mutual certification performed between the lowermost-level registration authority 1002 and the end entity 1001) so as to produce $E_{Ks}$ ({IA<<EE>>}). The data $E_{Ks}$ is then transmitted to the end entity 1001. The end entity 1001 decrypts the received data using its own session key and verifies the appended signature. Thereafter, the end entity 1001 stores the data that is the public key certificate.

As mentioned above, an end entity and a lower-level registration authority or upper-level registration authority, and the lower-level registration authority or upper-level registration authority and an issuer authority mutually certify and mutually transfer data. Meanwhile, a public key certificate for the end entity is issued. In the above description, the two-level hierarchical structure is composed of the lowermost-level registration authorities and upper-level registration authority. Alternatively, a hierarchical structure having three or more levels will do. Even in this case, a request for issuance of a public key certificate is transferred from a lower-level registration authority to an upper-level registration authority, and an issued public key certificate is transferred from the upper-level registration authority to the lower-level registration authority. The public key certificate is thus issued.

In order to issue a public key certificate via registration authorities included in the foregoing hierarchical structure, an upper-level registration authority and a lower-level registration authority must comply with certain rules. For example, the rules described below must be complied with.

An upper-level registration authority determines a security policy for a lower-level registration authority.

The security policy of the lower-level registration authority must cover the security policy of the upper-level registration authority.

The upper-level registration authority must be able to check the security policy of the lower-level registration authority if necessary.

What is referred to as the security policy is the rules for use concerning security on which the upper-level registration authority and lower-level registration authority have agreed. An example of the security policy stipulates the following items:

(1) the responsibilities and powers the upper-level and lower-level registration authorities assume, or more particularly, the ranges of responsibilities the upper-level and lower-level registration authorities assume, the persons in charge and operators who work for the upper-level and lower-level registration authorities, and (2) the rules of use concerning a procedure of issuing a public key certificate, or more particularly, the rules and format according to which registration authorities must request issuance (for example, a hierarchical level associated with a distinguished name (DN) must be consistent with the hierarchical level of a registration authority).

A method of checking a security policy is, for example, such that when a lower-level registration authority requests issuance of a public key certificate, an upper-level registration authority monitors the lower-level registration authority to see if the lower-level registration authority has requested issuance in compliance with the security policy. Otherwise, the upper-level registration authority asks the lower-level registration authority to report how the lower-level registration authority has requested issuance, and checks based on the received report if the lower-level registration authority has requested issuance in compliance with the security policy.

Figure 12:
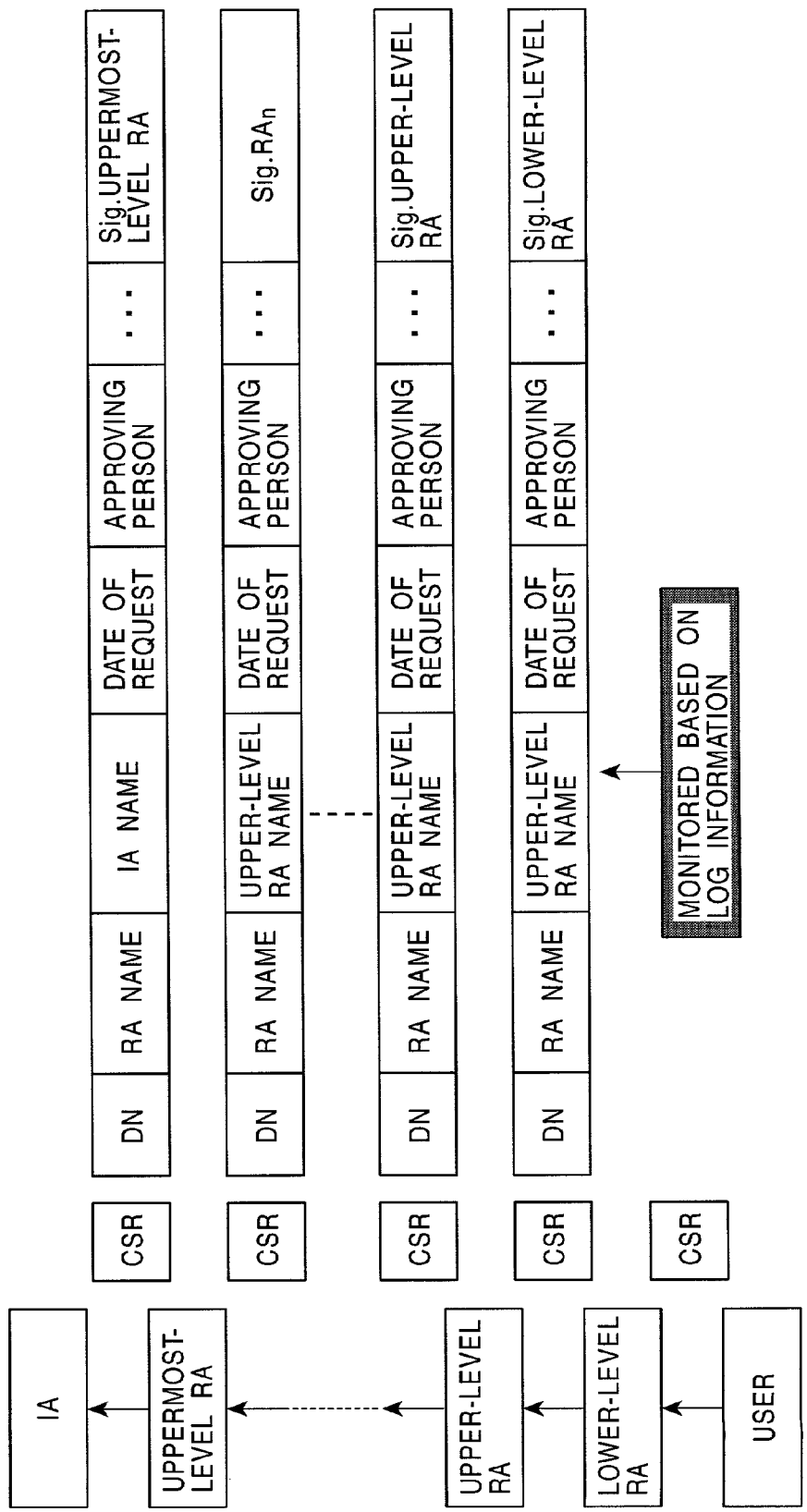
FIG. 12 shows an example of a data structure of data that is transferred between registration authorities during issuance of a public key certificate to an end entity accommodated by the public key certificate issuance request processing system in accordance with the present invention.

FIG. 12 shows an example of a data structure adopted when a request for issuance of a public key certificate is transferred from an end entity to an issuer authority (IA) via a plurality of registration authorities (RAs) included in a hierarchical structure with data, which is stipulated in a predetermined security policy, appended to the request.

In FIG. 12, CSR stands for a certificate signature request that is a request for issuance of a public key certificate. Subsequent data items DN to Sig.-RA are included in a data structure stipulated in the security policy on which registration authorities included in a hierarchical structure agree on.

The data item DN specifies a distinguished name assigned to each registration authority. The data item RA Name specifies the name of each registration authority. The data item Upper-level RA Name specifies the name of a registration authority that is a destination to which a request for issuance of a public key certificate is transferred. The data item Date of Request specifies the date of transfer of a request for issuance of a public key certificate. The data item Approving Person is identification data with which a person who has approved that each registration authority transfers a request for issuance of a public key certificate. Other data items stipulated in the security policy succeed the data item Approving Person. A signature (Sig.-RA) produced by applying the secret key of each registration authority to the hash values of the data items.

Each registration authority receives a request for issuance of a public key certificate (CSR) made by a lower-level registration authority and the data items stipulated in the security policy. After an appended signature is verified, if it is recognized that the request for issuance has been made in compliance with the security policy, the registration authority transfers the request for issuance of a public key certificate (CSR) and the data items stipulated in the security policy to an upper-level registration authority.

Figure 13:
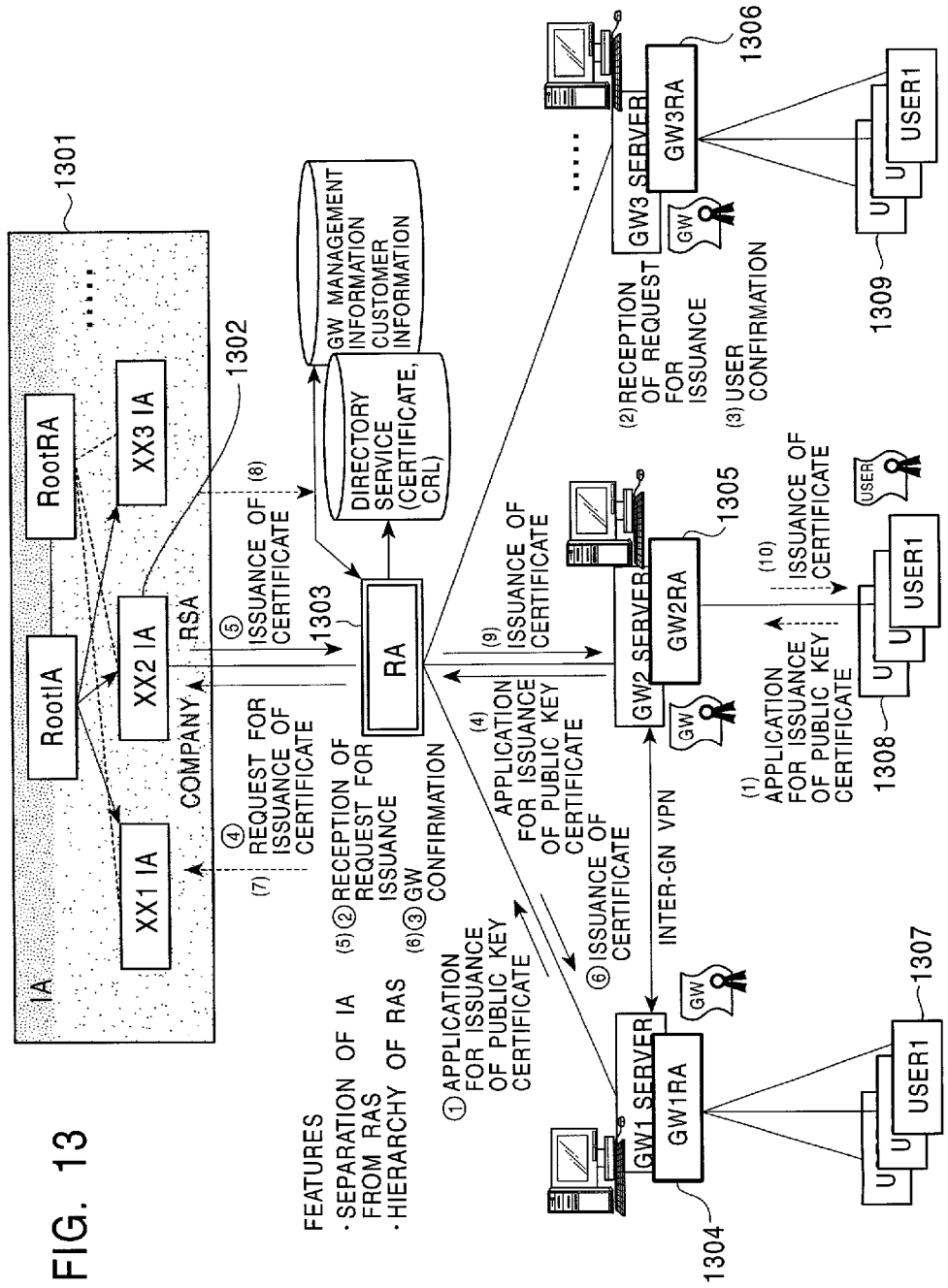
FIG. 13 shows a concrete example of the configuration of the public key certificate issuance request processing system in accordance with the present invention.

FIG. 13 shows a concrete example of a case to which the hierarchical structure of registration authorities in accordance with the present invention is adaptable. Referring to FIG. 13, an issuer authority (IA) 1301 is divided into a plurality of issuer authorities (XX1IA to XX3IA), and put into operation.

An uppermost-level registration authority (RA) 1303 is connected to one issuer authority (XX2IA) 1302. Gateway (GW) registration authorities 1304, 1305, and 1306 that are comparable to lower-level registration authorities are connected to the uppermost-level registration authority 1303. The gateway registration authorities 1304, 1305, and 1306 are lowermost-level registration authorities each of which manage end entities (user) 1307, 1308, or 1309.

The uppermost-level registration authority 1303 manages the gateway registration authorities 1304, 1305, and 1306 and issues a public key certificate thereto (see FIG. 4 and FIG. 5 that describe the sequence of issuing a public key certificate). The uppermost-level registration authority 1303 manages the gateway registration authorities 1304, 1305, and 1306, and passes the power and responsibility for issuance of a public key certificate to each gateway registration authority according to an agreement made with the gateway registration authority. Each of the gateway registration authorities 1304, 1305, and 1306 issues a public key certificate to the end entities 1307, 1308, or 1309 that rank below the gateway registration authority (see FIG. 9 and FIG. 10 describing the sequence of issuing a public key certificate). Each of the gateway registration authorities 1304, 1305, and 1306 takes the responsibility of managing the end entities 1307, 1308, or 1309 in compliance with the agreement made with the uppermost-level registration authority 1303.

In the structural drawing of FIG. 13, (1) to (6) denote processing stages according to which the gateway registration authority 1304 issues a public key certificate. First, the gateway registration authority 1304 requests the uppermost-level registration authority 1303 to issue a public key certificate. The uppermost-level registration authority 1303 receives the request. At this time, the uppermost-level registration authority 1303 checks if the procedure according to which the gateway registration authority has made a request complies with a security policy that stipulates processing between hierarchical levels. The uppermost-level registration authority 1303 then transfers the request for issuance of a certificate to the issuer authority 1302.

The issuer authority 1302 produces a public key certificate according to a predefined procedure, and transmits the public key certificate to the uppermost-level registration authority 1303. The uppermost-level registration authority 1303 transfers the received public key certificate to the gateway registration authority 1304 that has made the request for issuance thereof. Meanwhile, mutual certification between two registration authorities, production of a signature that is appended to data to be transferred, and verification of the signature are carried out.

Processing stages (1) to (10) described in FIG. 13 are followed when a request for issuance of a public key certificate is made by an end entity that is a user 1308. First, the user 1308 requests the gateway registration authority 1305 to issue a certificate. The gateway registration authority 1305 receives the request and checks the user. Thereafter, the gateway registration authority 1305 transfers the request for issuance of a certificate to the uppermost-level registration authority 1303. The uppermost-level registration authority 1303 receives the request. At this time, the uppermost-level registration authority 1303 checks if the procedure according to which the gateway registration authority has transferred the request complies with the security policy that stipulates processing between hierarchical levels. The uppermost-level registration authority 1303 then transfers the request for issuance of a certificate to the issuer authority 1302.

The issuer authority 1302 produces a public key certificate according to a predefined procedure, and transmits the public key certificate to the uppermost-level registration authority 1303. The uppermost-level registration authority 1303 transfers the received public key certificate to the gateway registration authority 1305. The gateway registration authority 1305 transmits the public key certificate to the user 1308 who is an end entity. Meanwhile, mutual certification between registration authorities, production of a signature that is appended to data to be transferred, and verification of the signature are carried out.

Figure 14:
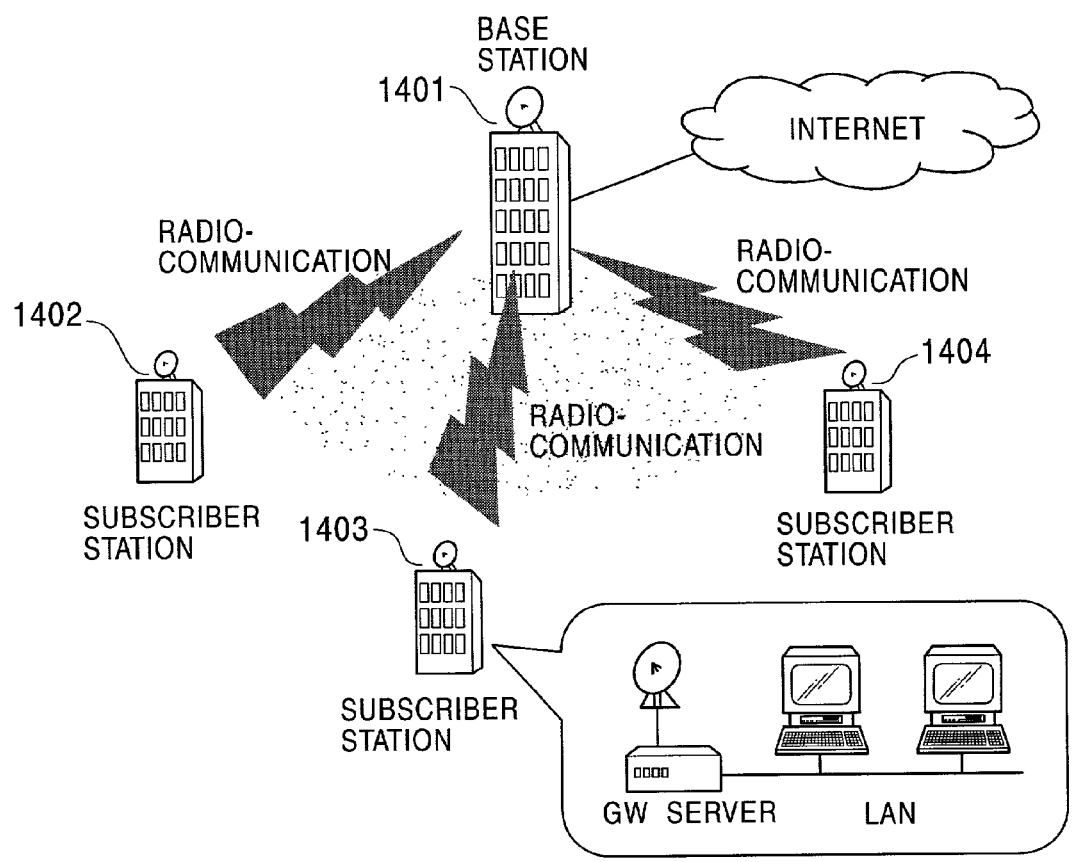
FIG. 14 shows a concrete example of the configuration of the public key certificate issuance request processing system in accordance with the present invention.

FIG. 14 is a conceptual diagram showing a case where the hierarchical structure shown in FIG. 13 is implemented in a radiocommunication network. The uppermost-level registration authority 1303 shown in FIG. 13 corresponds to a base station 1401. The gateway registration authorities 1304, 1305, and 1306 shown in FIG. 13 correspond to subscriber stations 1402, 1403, and 1404. Users who are end entities are connected to each subscriber station over, for example, a LAN.

A user who is an end entity requests a subscriber station, which acts as a lowermost-level registration authority, to issue a public key certificate. The subscriber station transfers the request for issuance of a public key certificate made by the end entity to the base station that is an upper-level registration authority included in the hierarchical structure. At this time, data stipulated in a security policy described in conjunction with FIG. 12 is transferred between registration authorities.

The present invention has been stated by taking a specific embodiment for instance. However, it is apparent that a person with ordinary skill in the art can modify or alter the embodiment without a departure from the gist of the present invention. Namely, the present invention has merely be disclosed by presenting the embodiment but will not be limited to the embodiment. For an understanding of the gist of the present invention, "What is Claimed is" should be perused.

As described so far, according to the present invention, a public key certificate issuance request processing system has registration authorities structured hierarchically. Each of registration authorities of a hierarchical level manages and examines registration authorities that rank immediately below the registration authority or end entities. The registration authority receives a request for issuance of a public key certificate from a lower-level registration authority or an end entity, and transfers the request for issuance of a public key certificate to an upper-level registration authority. Consequently, an increase in a load each registration authority must incur for processing is prevented. A hierarchical structure of registration authorities is formed under any standard that stipulates, for example, a security policy, scalability, geographical classification, functional classification, or an organization. Consequently, within one hierarchical structure, a request for issuance of a public key certificate can be processed in compliance with unique rules including a unique security policy.

What is claimed is:

1. A public key certificate issuance request processing system comprising:
   a public key certificate issuer authority that issues a public key certificate to an object of certification that transfers data according to a public-key encryption technology; and
   a hierarchical structure of registration authorities having at least two levels,
   wherein said hierarchical structure of registration authorities comprises:
   an uppermost-level registration authority that transfers data to or from said public key certificate issuer authority, certifies a registration authority which ranks immediately below, receives a request for issuance of a public key certificate made by said registration authority that ranks immediately below and that is the object of certification, and transfers the request for issuance of a public key certificate to said public key certificate issuer authority; and
   a lowermost-level registration authority that ranks lowest within said hierarchical structure of registration authorities, certifies end entities that said lowermost-level registration authority controls, and transfers a request for issuance of a public key certificate, which is made by an end entity, to an upper-level registration authority that ranks immediately above, and
   wherein:
   when data is to be transferred between registration authorities included in said hierarchical structure of registration authorities during issuance of a public key certificate, mutual certification is performed using previously stored embedded keys;
   if the mutual certification succeeds, data is transferred between the registration authorities; and
   said uppermost-level registration authority included in said hierarchical structure of registration authorities manages public key certificates, which are issued from said public key certificate issuer authority to registration authorities or end entities, to provide a directory service that identifies the public key certificates.

2. A public key certificate issuance request processing system according to claim 1, wherein:
   a registration authority included in said hierarchical structure of registration authorities certifies registration authorities that rank immediately below end entities, and examines and receives a request for issuance of a public key certificate made by a registration authority that ranks immediately below or an end entity; and
   if it is judged through the examination that the conditions for issuance of a public key certificate are satisfied, the registration authority transfers the request for issuance of a public key certificate made by the lower-level registration authority or end entity to said issuer key certificate issuer authority.

3. A public key certificate issuance request processing system according to claim 1, wherein:
   in said hierarchical structure of registration authorities, one hierarchical structure of registration authorities having registration authorities that rank below one apical-level registration authority and end entities is a hierarchical structure in which a request for issuance of a public key certificate is processed in compliance with a security policy that is adopted in common within the hierarchical structure.

4. A public key certificate issuance request processing system according to claim 1, wherein:
   in said hierarchical structure of registration authorities, each independent hierarchical structure of registration authorities having registration authorities that rank below one apical-level registration authority and end entities is independent of any other independent hierarchical structure of registration authorities in terms of any of a group of end entities, a load to be incurred for processing, a geographical condition, and an organizational condition.

5. A public key certificate issuance request processing system according to claim 1, wherein:
   in said hierarchical structure of registration authorities, each independent hierarchical structure of registration authorities having registration authorities that rank below one apical-level registration authority and end entities is independent of any other independent hierarchical structure of registration authorities in terms of the processing capability of a registration authority.

6. A public key certificate issuance request processing system according to claim 1, wherein:
   a registration authority included in said hierarchical structure of registration authorities judges whether a request for issuance of a public key certificate is made by a lower-level registration authority, which is an object of certification for the registration authority, in compliance with a security policy adopted within said hierarchical structure of registration authorities;
   if the registration authority judges that the request for issuance of a public key certificate is made in compliance with the security policy, the registration authority transfers the request for issuance of a public key certificate to an upper-level registration authority that ranks immediately above said public key certificate issuer authority.

7. A public key certificate issuance request processing system according to claim 1, wherein:
   when data is transferred between registration authorities included in said hierarchical structure of registration authorities, a digital signature of a data transmitting side is appended to data to be transferred; and
   a data receiving side verifies the digital signature.

8. A public key certificate issuance request processing method for issuing a public key certificate to an object of certification, which transfers data according to a public-key encryption technology, in response to a request for issuance of a public key certificate, said public key certificate issuance request processing method comprising:

a step at which, in a hierarchical structure of registration authorities that has at least two levels, that is, has a public key certificate issuer authority as an apex level and end entities as a lowermost level, a request for issuance of a public key certificate made by an end entity or registration authority that is an entity requesting issuance of a public key certificate is received and examined by a registration authority that ranks immediately above the requesting entity; and a step at which if the registration authority that ranks immediately above judges through the examination that the request for issuance of a public key certificate should be granted, the request for issuance of a public key certificate made by the requesting entity is transferred to the upper-level registration authority or said public key certificate issuer authority, and wherein:

when data is to be transferred between registration authorities included in said hierarchical structure of registration authorities during issuance of a public key certificate, mutual certification is performed using previously stored embedded keys;

if the mutual certification succeeds, data is transferred between the registration authorities; and said uppermost-level registration authority included in said hierarchical structure of registration authorities manages public key certificates, which are issued from said public key certificate issuer authority to registration authorities or end entities, to provide a directory service that identifies the public key certificates.

9. A public key certificate issuance request processing method according to claim 8, wherein:

a registration authority included in said hierarchical structure of registration authorities judges whether a request for issuance of a public key certificate is made by a lower-level registration authority, which is an object of certification for the registration authority, in compliance with a security policy that is adopted within said hierarchical structure of registration authorities;

if the registration authority judges that the request for issuance of a public key certificate is made in compliance with the security policy, the registration authority transfers the request for issuance of a public key certificate to an upper-level registration authority that ranks immediately above said public key certificate issuer authority.

10. A public key certificate issuance request processing method according to claim 8, wherein:

when data is transferred between registration authorities included in said hierarchical structure of registration authorities, mutual certification is performed; and if the mutual certification succeeds, data is transferred between registration authorities.

11. A public key certificate issuance request processing method according to claim 8, wherein:

when data is transferred between registration authorities included in said hierarchical structure of registration authorities, a digital signature of a data sending side is appended to data to be transferred; and a data receiving side verifies the signature.

* * * * *